US009918343B2

(12) United States Patent
Son et al.

(10) Patent No.: US 9,918,343 B2
(45) Date of Patent: Mar. 13, 2018

(54) WIRELESS COMMUNICATION METHOD FOR SIMULTANEOUS DATA COMMUNICATION, AND WIRELESS COMMUNICATION TERMINAL USING SAME

(71) Applicant: WILUS INSTITUTE OF STANDARDS AND TECHNOLOGY INC., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignee: Wilus Institute Of Standards And Technology Inc., Seoul (KR)

( * ) Notice: Subject to any disclaimer, the term of this patent is extended or adjusted under 35 U.S.C. 154(b) by 0 days.

(21) Appl. No.: 15/674,501

(22) Filed: Aug. 10, 2017

(65) Prior Publication Data
US 2017/0367119 A1 Dec. 21, 2017

Related U.S. Application Data

(63) Continuation of application No. 15/435,261, filed on Feb. 16, 2017, now Pat. No. 9,763,268, which is a
(Continued)

(30) Foreign Application Priority Data

Aug. 18, 2014 (KR) .................. 10-2014-0107321
Dec. 2, 2014 (KR) .................. 10-2014-0170812
Mar. 13, 2015 (KR) .................. 10-2015-0035308

(51) Int. Cl.
*H04W 74/08* (2009.01)
*H04W 72/08* (2009.01)
(Continued)

(52) U.S. Cl.
CPC ...... *H04W 74/0816* (2013.01); *H04B 17/318* (2015.01); *H04W 72/082* (2013.01); *H04W 84/12* (2013.01)

(58) Field of Classification Search
None
See application file for complete search history.

(56) References Cited

U.S. PATENT DOCUMENTS 7,885,287 B2 * 2/2011 Bachrach .......... H04W 74/0816
370/447
9,198,194 B2 * 11/2015 Meylan ............. H04W 72/0406
(Continued)

FOREIGN PATENT DOCUMENTS

WO  2014/011006  1/2014
WO  2016/028032  2/2016

OTHER PUBLICATIONS

International Search Report for PCT/KR2015/008498 dated Dec. 11, 2015 and its English translation from WIPO (published as WO 2016/028032).
(Continued)

*Primary Examiner* — Brian Roberts
(74) *Attorney, Agent, or Firm* — Ladas & Parry, LLP

(57) ABSTRACT

The present invention relates to a wireless communication method for simultaneous data communication and a wireless communication terminal using the same, and more particularly, to a wireless communication method for suppressing interference between terminals and ensuring fairness when performing data simultaneous communication for spatial reuse of communication system and wireless communication terminal using the same.
For this, provided are a wireless communication method and a wireless communication terminal using the same. The method includes: receiving a wireless signal of a specific channel; extracting basic service set (BSS) identifier infor-
(Continued)

mation of the received wireless signal; extracting length information from the wireless signal wherein the length information represents information relating to a transmission completion time point of the wireless signal; and adjusting a data transmission period of the terminal based on the extracted length information, when the BSS identifier information of the wireless signal is different from BSS identifier information of the terminal.

12 Claims, 15 Drawing Sheets

Related U.S. Application Data continuation of application No. PCT/KR2015/008498, filed on Aug. 13, 2015.

(51) Int. Cl.
*H04B 17/318* (2015.01)
*H04W 84/12* (2009.01)

(56) References Cited

U.S. PATENT DOCUMENTS

| | | |
|---|---|---|
| 2006/0221879 A1 | 10/2006 | Nakajima et al. |
| 2006/0268924 A1 | 11/2006 | Marinier et al. |
| 2007/0041334 A1 | 2/2007 | Song et al. |
| 2009/0279514 A1* | 11/2009 | Seok ............... H04W 74/0816 370/336 |
| 2014/0029433 A1 | 1/2014 | Wentink |
| 2014/0269544 A1* | 9/2014 | Zhu ................... H04L 1/1671 370/329 |
| 2017/0164406 A1 | 6/2017 | Son et al. |

OTHER PUBLICATIONS

Written Opinion of the International Searching Authority for PCT/KR2015/008498 dated Dec. 11, 2015 and its English machine translation from WIPO (published as WO 2016/028032).

* cited by examiner

| BSS Identifier | BSS Identifier Information (BSS Color) |
|---|---|
| 1011...1000 | 000 |
| 1110...0101 | 101 |
| 0101...1101 | 101 |
| 1101...0111 | 111 |
| 0010...0001 | 001 |
| 1010...1011 | 011 |
| 0000...0011 | 011 |
| 0100...0000 | 000 |
| 0110...0110 | 110 |

| Rate Bit Field | Existing information | | | BSS Identifier Information |
|---|---|---|---|---|
| | Data Rate (Mbps) | Modulation Scheme | Coding Rate | |
| 1101 | 6 | BPSK | 1/2 | - |
| 1111 | 9 | BPSK | 3/4 | - |
| 0101 | 12 | QPSK | 1/2 | - |
| 0111 | 18 | QPSK | 3/4 | - |
| 1001 | 24 | 16-QAM | 1/2 | - |
| 1011 | 36 | 16-QAM | 3/4 | - |
| 0001 | 48 | 64-QAM | 2/3 | - |
| 0011 | 54 | 64-QAM | 3/4 | - |
| 1100 | - | - | - | 110 |
| 1110 | - | - | - | 111 |
| 0100 | - | - | - | 010 |
| 0110 | - | - | - | 011 |
| 1000 | - | - | - | 100 |
| 1010 | - | - | - | 101 |
| 0000 | - | - | - | 000 |
| 0010 | - | - | - | 001 |

WIRELESS COMMUNICATION METHOD FOR SIMULTANEOUS DATA COMMUNICATION, AND WIRELESS COMMUNICATION TERMINAL USING SAME

CROSS-REFERENCE TO RELATED APPLICATIONS

This application is a continuation of U.S. patent application Ser. No. 15/435,261 filed on Aug. 13, 2015, which is a continuation of International Patent Application No. PCT/KR2015/008498 filed on Aug. 13, 2015, which claims the priority to Korean Patent Application No. 10-2014-0107321 filed in the Korean Intellectual Property Office on Aug. 18, 2014, Korean Patent Application No. 10-2014-0170812 filed in the Korean Intellectual Property Office on Dec. 2, 2014, and Korean Patent Application No. 10-2015-0035308 filed in the Korean Intellectual Property Office on Mar. 13, 2015, the entire contents of which are incorporated herein by reference.

TECHNICAL FIELD

The present invention relates to a wireless communication method for simultaneous data communication and a wireless communication terminal using the same, and more particularly, to a wireless communication method for suppressing interference between terminals and ensuring fairness when performing simultaneous data communication for spatial reuse of communication system and wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

As described above, an object of the present invention is to provide high-efficiency/high-performance wireless LAN communication in a high-density environment.

In particular, an object of the present invention is to provide a method for efficiently transmitting data in an overlapped basic service set (BSS) environment.

Further, another object of the present invention is to increase a transmission opportunity and transmission rate of data by providing an efficient spatial reuse method in the overlapped BSS environment.

Further, another object of the present invention is to eliminate the unfairness problem of a legacy terminal that may occur when an adjusted CCA threshold is used for channel access.

Further, another object of the present invention is to minimize an interference problem between terminals in a spatial reuse period.

Technical Solution

In order to achieve the objects, the present invention provides a wireless communication method and a wireless communication terminal as below.

First, the present invention provides a wireless communication method of a terminal including: receiving a wireless signal of a specific channel; measuring a signal strength of the received wireless signal; and determining whether the specific channel is busy based on the measured signal strength and BSS identifier information of the wireless signal.

In this case, the determining may be performed based on clear channel assessment (CCA) for the specific channel, and a CCA threshold used for the CCA may be set to different levels according to whether the BSS identifier information of the wireless signal is the same as BSS identifier information of the terminal.

Further, when the BSS identifier information of the wireless signal is the same as BSS identifier information of the terminal, a first CCA threshold may be used for the CCA and when the BSS identifier information of the wireless signal is different from BSS identifier information of the terminal, a second CCA threshold having a higher level than the first CCA threshold may be used for the CCA.

In addition, the wireless communication method may further include obtaining at least one of legacy wireless LAN information and non-legacy wireless LAN information by using preamble information of the received wireless signal, wherein in the determining, when the non-legacy wireless LAN information is obtained from the wireless signal, whether the specific channel is busy may be determined based on the BSS identifier information of the wireless signal.

Next, the present invention provides a wireless communication method of a terminal including: receiving a wireless signal of a specific channel; measuring a signal strength of the received wireless signal; obtaining at least one of legacy wireless LAN information and non-legacy wireless LAN information by using preamble information of the received wireless signal; and determining whether the specific channel is busy based on BSS identifier information of the wireless signal when the measured signal strength is between a first clear channel assessment (CCA) threshold and a second CCA threshold and the non-legacy wireless LAN information is obtained from the wireless signal.

In this case, the BSS identifier information of the wireless signal may represent abbreviated information of a BSS identifier for the wireless signal.

According to the embodiment of the present invention, in the determining, whether the specific channel is busy may be determined based on a result of comparing the BSS identifier information of the wireless signal and the BSS identifier information of the terminal.

In this case, in the determining, when the BSS identifier information of the wireless signal is different from the BSS identifier information of the terminal, it may be determined that the specific channel is in an idle state.

Further, in the determining, when the BSS identifier information of the wireless signal is the same as the BSS identifier information of the terminal, it may be determined that the specific channel is in a busy state.

According to an embodiment of the present invention, the wireless signal may include a first preamble for a legacy terminal and a second preamble for a non-legacy terminal, and the BSS identifier information of the wireless signal may be extracted from the second preamble of the wireless signal.

According to another embodiment of the present invention, the wireless signal may be configured to include the first preamble for the legacy terminal and the second preamble for the non-legacy terminal and the first preamble may be configured to at least include a first subcarrier set for the legacy terminal, and when the first preamble is configured to additionally include a second subcarrier set different from the first subcarrier set, the non-legacy wireless LAN information may be obtained from the second subcarrier set.

In this case, the BSS identifier information of the received wireless signal may be extracted from information on the second subcarrier set of the first preamble.

According to yet another embodiment of the present invention, the wireless signal may include the first preamble for the legacy terminal and the second preamble for the non-legacy terminal, and whether the wireless signal includes the non-legacy wireless LAN information is determined based on information on predetermined bits of the first preamble.

According to an embodiment of the present invention, the wireless signal may include the first preamble for the legacy terminal and the second preamble for the non-legacy terminal, and the BSS identifier information of the wireless signal may be extracted from the predetermined bit field of the first preamble.

In this case, a predetermined bit of the predetermined bit field may represent whether the wireless signal includes the non-legacy wireless LAN information, and when the predetermined bit represents that the wireless signal includes the non-legacy wireless LAN information, the BSS identifier information of the wireless signal may be extracted from the predetermined bit field.

According to another embodiment of the present invention, the first preamble may be configured to at least include the first subcarrier set for the legacy terminal, and when the first preamble is configured to additionally include the second subcarrier set different from the first subcarrier set, the BSS identifier information of the wireless signal may be extracted from the predetermined bit field.

Next, the present invention provides a wireless communication method of a terminal including: receiving a wireless signal of a specific channel; extracting basic service set (BSS) identifier information of the received wireless signal; extracting length information from the wireless signal wherein the length information represents information relating to a transmission completion time point of the wireless signal; and adjusting a data transmission period of the terminal based on the extracted length information, when the BSS identifier information of the wireless signal is different from BSS identifier information of the terminal.

According to an embodiment, the length information represents information of a duration field in a frame of the wireless signal.

According to another embodiment, the length information represents transmission opportunity (TXOP) of an external terminal transmitting the wireless signal.

In this case, the length information is information obtained from at least one of a legacy preamble, a non-legacy preamble, and a MAC header of the wireless signal.

According to an embodiment of the present invention, the data transmission period is adjusted to be terminated before the transmission completion time point of the wireless signal according to the extracted length information.

More specifically, the data transmission period is adjusted to be terminated before the transmission completion time point of the wireless signal by more than a sum value of a short inter frame space (SIFS) time and a time required for transmission of a response message.

Additionally, the data transmission period represents a transmission opportunity (TXOP) of the terminal.

According to a further embodiment of the present invention, the method further includes: measuring a signal strength of the wireless signal; and determining whether the specific channel is busy based on the measured signal strength and the extracted BSS identifier information, wherein the data transmission period is adjusted when the specific channel is determined to be in an idle state and the terminal accesses the specific channel.

Additionally, the determining of whether the specific channel is busy is performed based on Clear Channel Assessment (CCA) for the specific channel, and a CCA threshold used for the CCA is set to different levels according to whether the BBS identifier information of the wireless signal is the same as the BSS identifier information of the terminal.

In this case, when the BBS identifier information of the wireless signal is the same as the BSS identifier information of the terminal, the first CCA threshold is used for the CCA and when the BBS identifier information of the wireless signal is different from the BSS identifier information of the terminal, a second CCA threshold having a higher level than the first CCA threshold is used for the CCA.

Next, the present invention provides a wireless communication method including: receiving a wireless signal of a specific channel; performing a clear channel assessment (CCA) based on a second CCA threshold which is higher than a first CCA threshold for a legacy terminal if the wireless signal has BSS identifier information different from a terminal; performing a backoff procedure when the channel is determined to be in an idle state as a result of the CCA; adjusting a backoff counter assigned to the terminal if the backoff procedure is suspended before the backoff counter of the backoff procedure expires; and resuming the backoff procedure using the adjusted backoff counter if the channel is in an idle state again.

In this case, the backoff counter assigned to the terminal is adjusted when the received signal strength of the wireless signal during the performing of the backoff procedure is between the first CCA threshold and the second CCA threshold.

According to an embodiment, the adjusting of the backoff counter restores the backoff counter to a value prior to the backoff procedure.

According to another embodiment, the adjusting of the backoff procedure allocates a new backoff counter for the terminal.

Next, the present invention provides a wireless communication method of a terminal including: being assigned a first backoff counter and a second backoff counter for a backoff procedure of the terminal; receiving a wireless signal having BSS identifier information different from that of the terminal; performing a backoff procedure based on the received signal strength of the wireless signal, wherein the backoff procedure consumes the first backoff counter when the received signal strength of the wireless signal is lower than a first clear channel assessment (CCA) threshold for a legacy terminal, and wherein the backoff procedure consumes the second backoff counter when the received signal strength of the wireless signal is higher than the first CCA threshold and lower than the second CCA threshold; and transmitting data when at least one of the first backoff counter and the second backoff counter expires.

According to an embodiment of the present invention, the first backoff counter and the second backoff counter are assigned in different random number ranges.

Next, the present invention provides a wireless communication method of a terminal including: receiving a request message (other BSS request message) having BSS identifier information different from that of the terminal; receiving a response message (other BSS response message) corresponding to the other BSS request message; and determining whether the terminal accesses the channel based on a received signal strength of the other BSS request message and a received signal strength of the other BSS response message.

According to an embodiment of the present invention, when the received signal strength of the other BSS response message is lower than the first CCA threshold and the received signal strength of the other BSS request message is lower than the second CCA threshold, the access of the terminal is allowed, wherein the second CCA threshold is set to a higher level than the first CCA threshold.

According to a further embodiment of the present invention, the method further includes, when it is determined that the terminal accesses the channel, transmitting a request message (same BSS request message) to a reception terminal indicating that data transmission of the terminal is possible; and transmitting data to the reception terminal when a same BSS response message corresponding to the same BSS request message is received from the reception terminal.

In this case, if the same BSS response message corresponding to the same BSS request message is not received from the reception terminal, the terminal defers channel access.

According to an embodiment, the request message is a request-to-send (RTS) message, and the response message is a clear-to-send (CTS) message.

According to another embodiment, the request message is null data packet (NDP), and the response message is ACK.

According to another embodiment, the request message is MAC protocol data unit (MPDU), and the response message is ACK.

Next, the present invention provides a wireless communication method of a terminal including: receiving a request message (other BSS request message) having BSS identifier information different from the terminal; receiving a response message (other BSS response message) corresponding to the other BSS request message; receiving from a transmission terminal a request message (same BSS request message) which has the same BSS identifier information as the terminal and uses the terminal as a receiver; and determining whether to transmit a same BSS response message corresponding to the same BSS request message based on the received signal strength of the other BSS request message and the received signal strength of the other BSS response message.

In this case, the same BSS response message indicates that data of the transmission terminal can be received.

According to an embodiment of the present invention, when the received signal strength of the other BSS response message is lower than the first CCA threshold and the received signal strength of the other BSS request message is lower than the second CCA threshold, the same BSS response message is transmitted to the transmission terminal, but the second CCA threshold is set to a higher level than the first CCA threshold.

According to an embodiment, the request message is a request-to-send (RTS) message, and the response message is a clear-to-send (CTS) message.

According to another embodiment, the request message is null data packet (NDP), and the response message is ACK.

According to another embodiment, the request message is MAC protocol data unit (MPDU), and the response message is ACK.

Next, the present invention provides a wireless communication terminal including: a transceiver transmitting and receiving a wireless signal; and a processor controlling an operation of the terminal, wherein the processor measures a signal strength of a wireless signal of a specific channel, which is received through the transceiver, and determines whether the specific channel is busy based on the measured signal strength and BSS identifier information of the wireless signal.

In this case, the processor may obtain at least one of legacy wireless LAN information and non-legacy wireless LAN information by using preamble information of the received wireless signal, and determine, when the non-legacy wireless LAN information is obtained from the wireless signal, whether the specific channel is busy based on the BSS identifier information of the wireless signal.

Further, the processor may perform the determination based on clear channel assessment (CCA) for the specific channel, and a CCA threshold used for the CCA may be set to different levels according to whether the BSS identifier information of the wireless signal is the same as BSS identifier information of the terminal.

Next, the present invention provides a wireless communication terminal including: a transceiver transmitting and receiving a wireless signal; and a processor controlling an operation of the terminal, wherein the processor measures a signal strength of the wireless signal received through the transceiver; obtains at least one of legacy wireless LAN information and non-legacy wireless LAN information by using preamble information of the received wireless signal; and determines whether the specific channel is busy based on BSS identifier information of the wireless signal when the measured signal strength is between a first clear channel assessment (CCA) threshold and a second CCA threshold and the non-legacy wireless LAN information is obtained from the wireless signal.

Next, the present invention provides a wireless communication terminal including: a transceiver for transmitting and receiving a wireless signal; and a processor for controlling an operation of the terminal wherein the terminal receives a wireless signal of a specific channel through the transceiver, and wherein the processor extracts BSS identifier information of the received wireless signal, extracts length information from the wireless signal the length information representing information related to the transmission completion time point of the wireless signal, and adjusts the data transmission period of the terminal based on the extracted length information, when the BSS identifier information of the wireless signal is different from BSS identifier information of the terminal.

Next, the present invention provides a wireless communication terminal including: a transceiver for transmitting and receiving a wireless signal; and a processor for controlling an operation of the terminal wherein the terminal receives a wireless signal of a specific channel, and wherein the processor performs a clear channel assessment (CCA) based on a second CCA threshold higher than a first CCA threshold for a legacy terminal if the wireless signal has BSS identifier information different from a terminal; performs a backoff procedure when the channel is determined to be in an idle state as a result of the CCA; adjusts a backoff counter assigned to the terminal if the backoff procedure is suspended before the backoff counter of the backoff procedure expires; and resumes the backoff procedure using the adjusted backoff counter if the channel is in an idle state again.

Next, the present invention provides a wireless communication terminal including: a transceiver for transmitting and receiving a wireless signal; and a processor for controlling an operation of the terminal wherein the terminal receives a wireless signal having BSS identifier information different from the terminal through the transceiver, and wherein the processor is assigned a first backoff counter and a second backoff counter for the backoff procedure of the terminal, performs a backoff procedure based on the received signal strength of the wireless signal, the backoff procedure consuming the first backoff counter when the received signal strength of the wireless signal is lower than a first clear channel assessment (CCA) threshold for a legacy terminal, and the backoff procedure consuming the second backoff counter when the received signal strength of the wireless signal is higher than the first CCA threshold and lower than a second CCA threshold, and transmits data when at least one of the first backoff counter and the second backoff counter expires.

Next, the present invention provides a wireless communication terminal including: a transceiver for transmitting and receiving a wireless signal; and a processor for controlling an operation of the terminal, wherein the terminal receives a request message (other BSS request message) having BSS identifier information different from that of the terminal through the transceiver and receives a response message (other BSS response message) corresponding to the other BSS request message, and wherein the processor determines whether the terminal accesses the channel based on a received signal strength of the other BSS request message and a received signal strength of the other BSS response message.

Next, the present invention provides a wireless communication terminal including: a transceiver for transmitting and receiving a wireless signal; and a processor for controlling an operation of the terminal, wherein the terminal receives a request message (other BSS request message) having BSS identifier information different from the terminal, receives a response message (other BSS response message) corresponding to the other BSS request message, and receives from a transmission terminal a request message (same BSS request message) which has the same BSS identifier information as the terminal and uses the terminal as a receiver, and wherein the processor determines whether to transmit a same BSS response message corresponding to the same BSS request message based on the received signal strength of the other BSS request message and the received signal strength of the other BSS response message.

Advantageous Effects

According to embodiments of the present invention, it can be efficiently determined whether a wireless signal received in an overlapped BSS environment is a wireless LAN signal of the same BSS and whether to adaptively use the corresponding channel can be decided based on the determination.

Further, according to another embodiment of the present invention, when the received wireless signal is a legacy wireless LAN signal from which BSS identifier information is not extracted, whether the channel is in a busy state is determined according to a received signal strength of the corresponding signal in a lump to minimize a time delay required to additionally determine a BSS identifier of the legacy wireless LAN signal during a CCA process.

Further, according to another embodiment of the present invention, when a wireless LAN signal having the same BSS identifier information as that of a terminal is received, an inequity problem in which different CCA thresholds are applied according to whether the corresponding wireless LAN signal includes non-legacy wireless LAN information can be resolved. That is, CCA thresholds for a legacy signal and a non-legacy signal are similarly applied to the wireless LAN signal having the same BSS identifier information as that of the terminal to maintain equity for channel occupation between a legacy terminal and a non-legacy terminal.

According to yet another embodiment of the present invention, since at least some of non-legacy wireless LAN information such as the BSS identifier information can be obtained from a legacy preamble before checking a non-legacy preamble, CCA may be performed within a shorter time.

According to still another embodiment of the present invention, when data transmission is performed in the spatial reuse period of a non-legacy terminal, the data transmission period of a corresponding terminal may be adjusted based on length information extracted from a received wireless signal, and through this, it is possible to solve the channel access delay problem of a legacy terminal.

Also, according to an embodiment of the present invention, mutual interference may be minimized effectively while a plurality of terminals perform communication at the same time.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0107321, 10-2014-0170812, and 10-2015-0035308 filed in the Korean Intellectual Property Office and the embodiments and mentioned items described in the respective applications are included in the Detailed Description of the present application.

Figure 1:
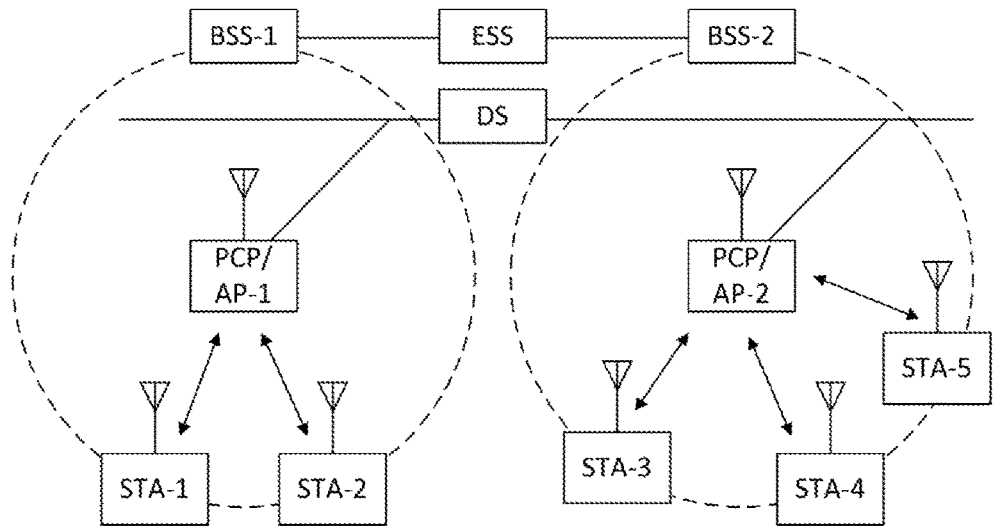
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
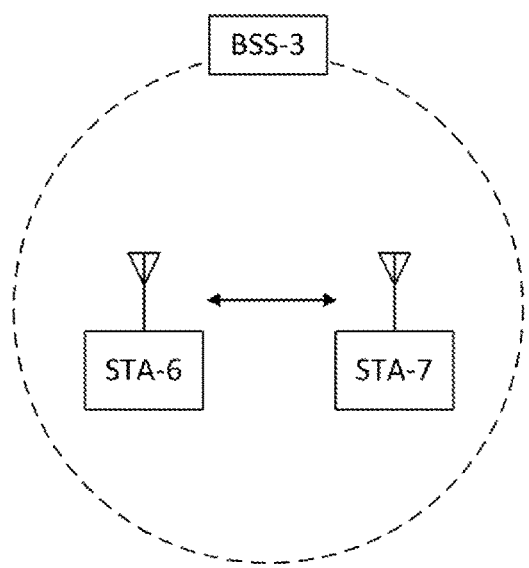
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
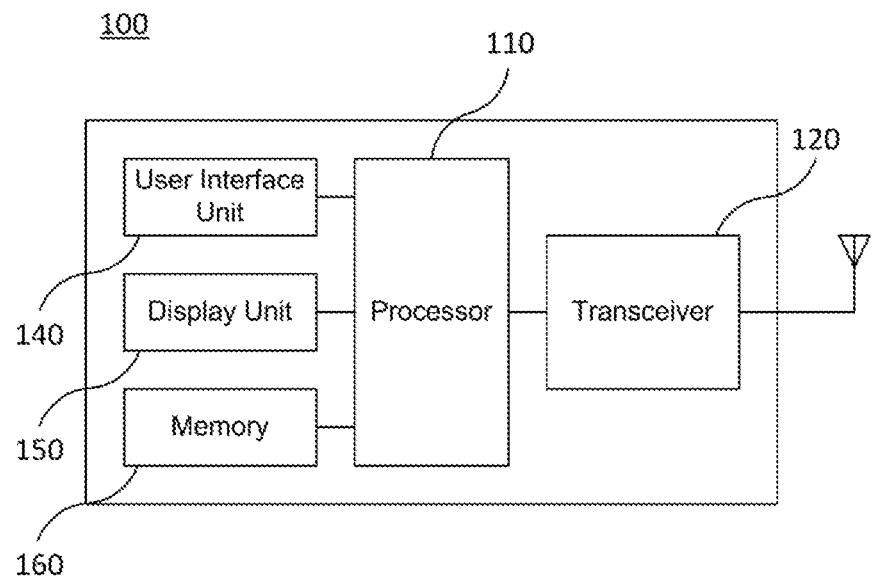
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
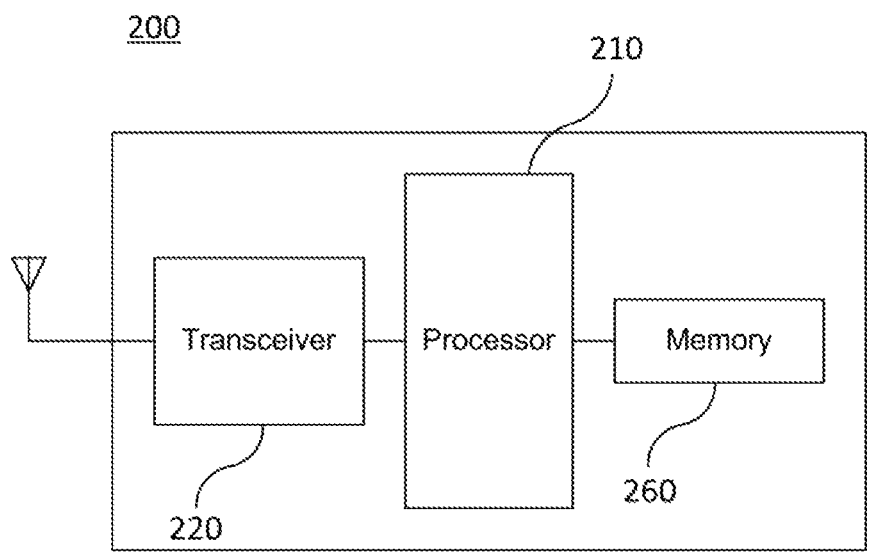
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
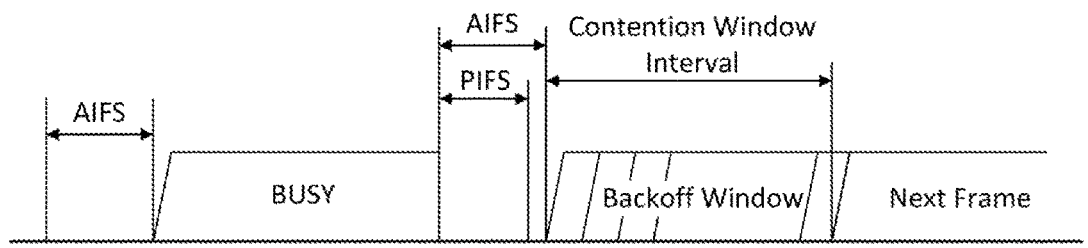
FIG. 5 is a diagram illustrating a carrier sense multiple access (CSMA)/collision avoidance (CA) method used in wireless LAN communication.

FIG. 5 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 6:
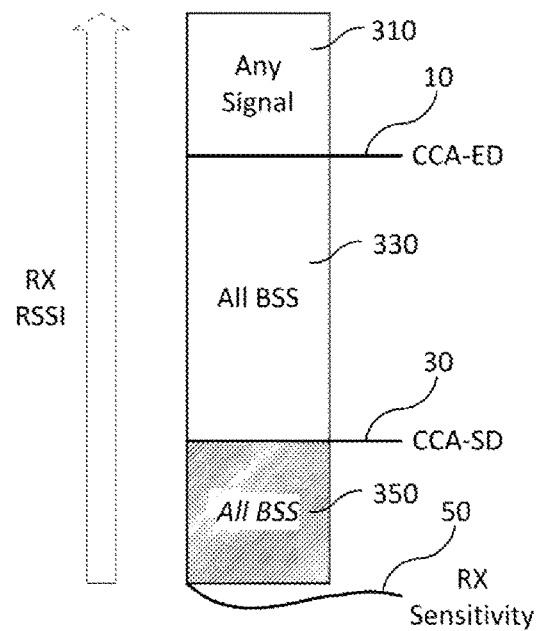
FIG. 6 is a diagram illustrating one embodiment of a wireless communication scheme using a CCA technique.

FIG. 6 is a diagram illustrating one embodiment of a wireless communication scheme using a CCA technique.

In wireless communication, for instance, the wireless LAN communication, whether the channel is busy may be sensed through the CCA. In this case, the CCA methods including a signal detection (SD) method, an energy detection (ED) method, a correlation detection (CD) method, and the like may be used.

First, the signal detection (CCA-SD) is a method that measures a signal strength of a preamble of a wireless LAN (that is, 802.11) frame. This method may stably detect the signal, but is disadvantageous in that the method operates only in an initial part of a frame where the preamble is present. According to an embodiment, the signal detection may be used in the CCA for a primary channel in a wideband wireless LAN. Next, the energy detection (CCA-ED) is a method that senses energy of all signals received with a specific threshold or more. This method may be used to sense a wireless signal in which the preamble is not normally sensed, for instance, signals such as Bluetooth, ZigBee, and the like. Further, the method may be used in the CCA for a secondary channel in which the signal is not continuously tracked. Meanwhile, the correlation detection (CCA-CD) as a method that may sense a signal level even in the middle of a wireless LAN frame uses that a wireless LAN signal has a periodic repetition pattern of orthogonal frequency division multiplex (OFDM) signal. That is, the correlation detection method receives wireless LAN data for a predetermined time and thereafter, detects signal strengths of the repetition patterns of an OFDM signal symbol.

According to the embodiment of the present invention, the access of the terminal to the channel may be controlled by using a predetermined CCA threshold for each CCA method. In the embodiment of FIG. 6, a CCA-ED threshold 10 represents a predetermined threshold in order to perform the energy detection and a CCA-SD threshold 30 represents a predetermined threshold in order to perform the signal detection. Further, receiving (RX) sensitivity 50 represents a minimum signal strength at which the terminal may decode the wireless signal. According to the embodiment, the RX sensitivity 50 may be set to a level which is the same as or lower than the CCA-SD threshold 30 according to a capability and a configuration of the terminal. Further, the CCA-ED threshold 10 may be set to a higher level than the CCA-SD threshold 30. For example, the CCA-ED threshold 10 and the CCA-SD threshold 30 may be set to −62 dBm and −82 dBm, respectively. However, the present invention is not limited thereto and the CCA-ED threshold 10 and the CCA-SD threshold 30 may be differently set according to whether the CCA-ED threshold 10 and the CCA-SD threshold 30 are thresholds for the primary channel, a bandwidth of a channel that performs the CCA, and the like.

According to the embodiment of FIG. 6, each terminal measures a received signal strength indicator (RX RSSI) of the received wireless signal and determines a channel state based on a comparison between the measured received signal strength and each set CCA threshold.

First, when a wireless signal 350 above the RX sensitivity 50, which is received in a specific channel has an RX RSSI of the CCA-SD threshold 30 or less, it is determined that the corresponding channel is idle. Therefore, the received signal is not processed or protected in the terminal and each terminal may attempt the access to the corresponding channel according to the method described in FIG. 5, and the like.

When a wireless LAN signal 330 having the RX RSSI of the CCA-SD threshold 30 or more is received in a specific channel, it is determined that the corresponding channel is in a busy state. Accordingly, the terminal that receives the corresponding signal delays the access to the channel. According to an embodiment, the terminal may determine whether the corresponding signal is the wireless LAN signal by using a signal pattern of a preamble part of the received wireless signal. According to the embodiment of FIG. 6, even in case that a wireless LAN signal of other BSS is received in addition to a wireless LAN signal of BSS which is the same with the corresponding terminal, each terminal determines that the channel is in the busy state.

Meanwhile, when a wireless signal 310 having the RX RSSI of the CCA-ED threshold 10 or more is received in a specific channel, it is determined that the corresponding channel is in the busy state. In case that another type of wireless signal (other than the wireless LAN signal) is received as well, the terminal determines that the corresponding channel is in the busy state, if the RX RSSI of the corresponding signal is the CCA-ED threshold 10 or more. Accordingly, the terminal that receives the corresponding signal delays the access to the channel.

Figure 7:
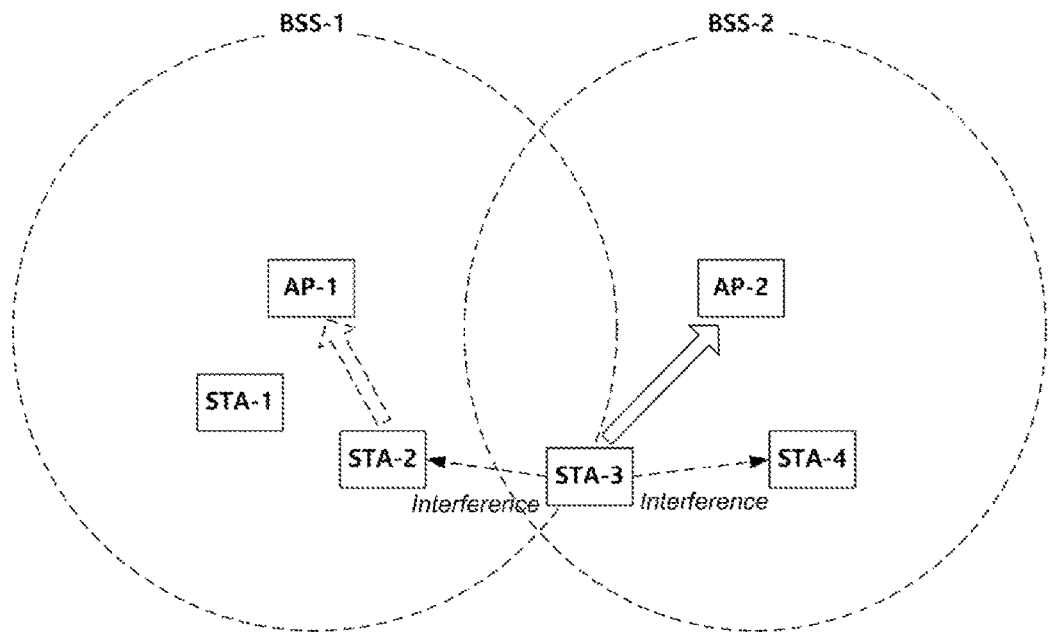
FIG. 7 is a diagram illustrating one example of an overlapped BSS environment.

FIG. 7 illustrates one example of an overlapping BSS (OBSS) environment. In FIG. 7, in BSS-1 operated by AP-1, station 1 (STA-1) and station 2 (STA-2) are associated with AP-1 and in BSS-2 operated by AP-2, station 3 (STA-3) and station 4 (STA-4) are associated with AP-2. In the overlapping BSS environment of FIG. 7, communication coverages of BSS-1 and BSS-2 at least partially overlap with each other.

As illustrated in FIG. 7, when STA-3 transmits upload data to AP-2, STA-3 may continuously interfere with STA-2 of BSS-1 positioned adjacent thereto. In this case, interference which occurs while BSS-1 and BSS-2 use the same frequency band (for example, 2.4 GHz, 5 GHz, or the like) and the same primary channel is referred to as co-channel interference (CCI). Further, interference which occurs while BSS-1 and BSS-2 use an adjacent primary channel is referred to as adjacent channel interference (ACI). The CCI or ACI may be received with a higher signal strength than the CCA threshold (e.g. CCA SD threshold) of STA-2 according to a distance between STA-2 and STA-3. When the interference is received by STA-2 with the higher strength than the CCA threshold, STA-2 recognizes that the corresponding channel is in the busy state to delay transmission of the upload data to AP-1. However, since STA-2 and STA-3 are stations that belong to different BSSs, when the CCA threshold of STA-2 increases, STA-2 and STA-3 may simultaneously upload to AP-1 and AP-2, respectively, thereby achieving an effect of spatial reuse.

Meanwhile, in FIG. 7, the transmission of the upload data by STA-3 in BSS-2 interferes even in STA-4 that belongs to the same BSS-2. In this case, when the CCA threshold of STA-4 increases similarly to STA-2, STA-3 and STA-4 that belong to the same BSS simultaneously transmit the upload data to AP-2, and as a result, a collision may occur. Therefore, in order to increase the CCA threshold for predetermined interference, it is needed to determine whether the corresponding interference is caused by signals that belong to the same BSS or signals that belong to different BSSs. To this end, each terminal needs to verify a BSS identifier of the received wireless LAN signal or other types of information to distinguish the BSS. Further, it is preferable that the BSS information is verified within a short time while the CCA process is performed.

FIGS. 8 to 13 are diagrams illustrating various embodiments of the CCA method according to the present invention. In the embodiments of FIGS. 8 to 13, an area marked with a shade indicates a wireless signal which is received but disregarded, that is, not protected by the terminal. In other words, when the wireless signal corresponding to the area marked with the shade is received, the terminal determines that the corresponding channel is in the idle state. Meanwhile, when a wireless signal corresponding to an area not marked with the shade is received, the terminal determines that the corresponding channel is in the busy state. In this case, the RX sensitivity may be set to the level which is the same as or lower than the CCA-SD threshold according to the capability and the configuration of the terminal. Further, the CCA-ED threshold may be set to the higher level than the CCA-SD threshold. Individual processes described in FIG. 5 may be performed based on a result of determining whether the channel is busy in each embodiment to be described below.

Figure 8:
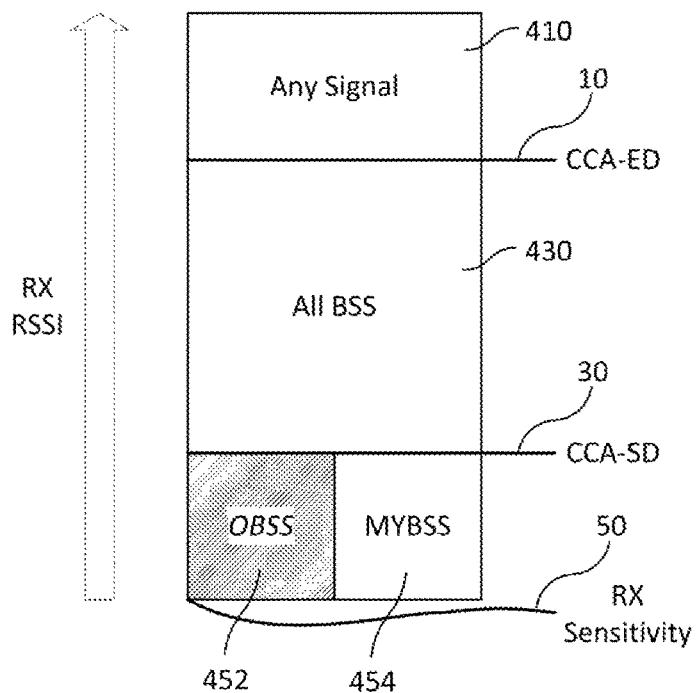
FIGS. 8 to 10 are diagrams illustrating various embodiments of a CCA method using BSS identifier information of a received wireless signal.
Figure 9:
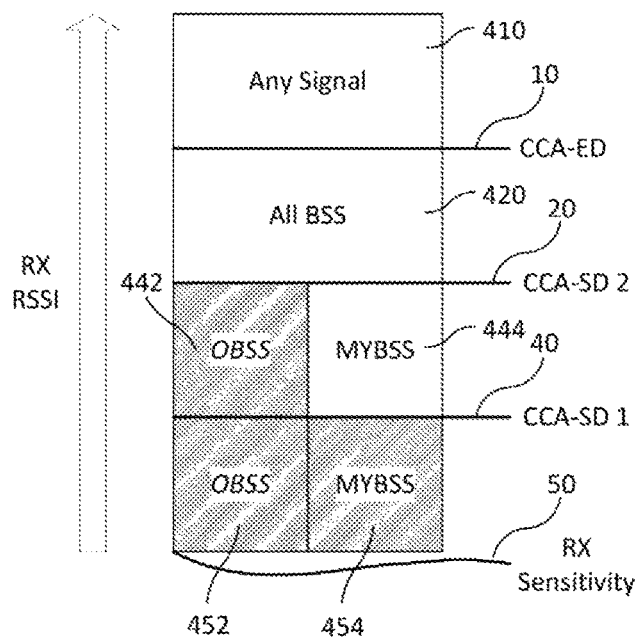
Figure 10:
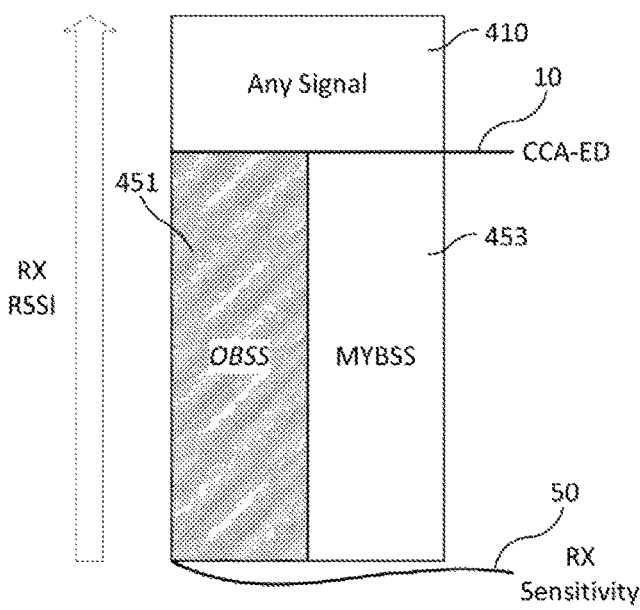

In each of the embodiments of FIGS. 8 to 10, the terminal may measure the RX RSSI of the received wireless signal and determine whether the corresponding signal is the wireless LAN signal. When the received signal is the wireless LAN signal having the BSS identifier information according to various embodiments to be described below, the terminal may extract the BSS identifier information from the corresponding signal and determine whether the extracted BSS identifier information is the same as the BSS identifier information of the corresponding terminal.

First, according to the embodiment of FIG. 8, the CCA threshold for the corresponding signal may be decided based on whether the received wireless signal is the wireless LAN signal having the BSS identifier information which is the same as the BSS identifier information of the terminal. In the embodiment of the present invention, the BSS identifier information of the terminal is BSS identifier information assigned to the corresponding terminal and may represent, when the corresponding terminal is a non-AP STA, BSS identifier information of an AP which the corresponding terminal is associated with or intends to be associated with. In this case, the terminal may receive the BSS identifier information from the AP and the received BSS identifier information may be stored in the corresponding terminal.

Referring to FIG. 8, when a received wireless signal of a specific channel is the wireless LAN signal having an RX RSSI of the RX sensitivity 50 or more and the CCA-SD threshold 30 or less, whether the channel is busy is determined based on whether the corresponding signal is the wireless LAN signal having the same BSS identifier information as that of the terminal. When the BSS identifier information extracted from the wireless signal is different from the BSS identifier information of the terminal (that is, in the case of OBSS wireless LAN signal 452), it is determined that the corresponding channel is in the idle state. However, when the BSS identifier information extracted from the wireless signal is the same as the BSS identifier information of the terminal (that is, in the case of MYBSS wireless LAN signal 454), it is determined that the corresponding channel is in the busy state.

Meanwhile, when the received wireless signal of the specific channel is a wireless LAN signal 430 having the RX RSSI between the CCA-SD threshold 30 and the CCA-ED threshold 10, it is determined that the corresponding channel is in the busy state. In this case, even in the case where the corresponding signal is a wireless LAN signal having different BSS identifier information from that of the terminal in addition to the case where the corresponding signal is the wireless LAN signal having the same BSS identifier information as that of the terminal, the terminal that receives the wireless LAN signal 430 determines that the channel where the corresponding signal is received is in the busy state.

During the energy detection process, when the wireless signal of the specific channel, which is received by the terminal is a wireless signal 410 having the RX RSSI of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

As such, according to the embodiment of FIG. 8, the CCA threshold applied to the wireless LAN signal having the same BSS identifier information as that of the terminal may have a different level from the CCA threshold applied to the wireless LAN signal having the different BSS identifier information from that of the terminal. According to an embodiment, the CCA threshold applied to the wireless LAN signal having the different BSS identifier information from that of the terminal is set to a higher level than the CCA threshold applied to the wireless LAN signal having the same BSS identifier information as that of the terminal. According to the embodiment of FIG. 8, as the CCA threshold for the wireless LAN signal having the different BSS identifier information from that of the terminal, the predetermined CCA-SD threshold 30 may be adopted and as the CCA threshold for the wireless LAN signal having the same BSS identifier information as that of the terminal, the level of the RX sensitivity 50 of the terminal may be adopted.

FIGS. 9 and 10 illustrate another embodiment of the CCA method using the BSS identifier information. In the embodiments of FIGS. 9 and 10, duplicative description of parts, which are the same as or correspond to the embodiment of FIG. 8, will be omitted.

First, according to the embodiment of FIG. 9, the CCA threshold for the corresponding signal may be decided based on whether the received wireless signal is the wireless LAN signal having the BSS identifier information which is the same as the BSS identifier information of the terminal.

Referring to FIG. 9, when the RX RSSI of a received wireless signal of a specific channel is the RX sensitivity 50 or more and a first CCA-SD threshold 40 or less, it is determined that the corresponding channel is in the idle state. In this case, both in the case where the received signal is a wireless LAN signal 454 having the same BSS identifier information as that of the terminal and in the case where the received signal is a wireless LAN signal 452 having the different BSS identifier information from that of the terminal, the terminal determines that the channel where the corresponding signal is received is in the idle state.

However, when the received wireless signal of the specific channel is the wireless LAN signal having the RX RSSI between the first CCA-SD threshold 40 and a second CCA-SD threshold 20, whether the channel is busy is determined based on whether the corresponding signal is the wireless LAN signal having the same BSS identifier information as that of the terminal. When the BSS identifier information extracted from the wireless signal is different from the BSS identifier information of the terminal (that is, in the case of OBSS wireless LAN signal 442), it is determined that the corresponding channel is in the idle state. However, when the BSS identifier information extracted from the wireless signal is the same as the BSS identifier information of the terminal (that is, in the case of MYBSS wireless LAN signal 444), it is determined that the corresponding channel is in the busy state. In the embodiment of FIG. 9, the second CCA-SD threshold 20 which is used to perform the signal detection for the wireless LAN signal having the different BSS identifier information from that of the terminal may be set to a level which is larger than the first CCA-SD threshold 40 and equal to or smaller than the CCA-ED threshold.

Meanwhile, when the received wireless signal of the specific channel is a wireless LAN signal 420 having an RX RSSI between the second CCA-SD threshold 20 and the CCA-ED threshold 10, it is determined that the corresponding channel is in the busy state. In this case, even in the case where the corresponding signal is a wireless LAN signal having different BSS identifier information from that of the terminal in addition to the case where the corresponding signal is the wireless LAN signal having the same BSS identifier information as that of the terminal, the terminal that receives the wireless LAN signal 420 determines that the channel where the corresponding signal is received is in the busy state.

During the energy detection process, when the received wireless signal of the specific channel by the terminal is a wireless signal 410 having the RX RSSI of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

As such, according to the embodiment of FIG. 9, the CCA threshold applied to the wireless LAN signal having the same BSS identifier information as that of the terminal may have a different level from the CCA threshold applied to the wireless LAN signal having the different BSS identifier information from that of the terminal. That is, as the CCA threshold for the wireless LAN signal having the same BSS identifier information as that of the terminal, the predetermined first CCA-SD threshold 40 may be adopted and as the CCA threshold for the wireless LAN signal having the different BSS identifier information from that of the terminal, the predetermined second CCA-SD threshold 20 may be adopted. Herein, the second CCA-SD threshold 20 may be set to a level which is higher than the first CCA-SD threshold 40 and equal to or lower than the CCA-ED threshold.

Next, according to the embodiment of FIG. 10, when the RX RSSI of a received wireless signal of a specific channel is the RX sensitivity 50 or more, the signal detection may be performed based on whether the corresponding signal is the wireless LAN signal having the same BSS identifier information as that of the terminal.

During the signal detection process, when the RX RSSI of the wireless signal received by the terminal is the RX sensitivity 50 or more and the wireless signal is a wireless LAN signal 453 having the same BSS identifier information as that of the terminal, it is determined that the corresponding channel is in the busy state. However, when the RX RSSI of the received wireless signal is the RX sensitivity 50 or more and the wireless signal is a wireless LAN signal 451 having different BSS identifier information from that of the terminal, it is determined that the corresponding channel is in the idle state.

Meanwhile, during the energy detection process, when the wireless signal received by the terminal is the wireless signal 410 having the RX RSSI of the CCA-ED threshold 10 or more, it is determined that the corresponding channel is in the busy state. The terminal determines that the corresponding channel is in the busy state regardless of whether the corresponding signal is the wireless LAN signal having the same BSS identifier information as that of the terminal and furthermore, regardless of whether the corresponding signal is the wireless LAN signal. Therefore, when the wireless LAN signal having the different BSS identifier information from that of the terminal is received at a level higher than the CCA-ED threshold 10, it is determined that the corresponding channel is in the busy state by the energy detection process.

As such, according to the embodiment of FIG. 10, the terminal may determine whether the channel is busy based on whether the received wireless signal is the wireless LAN signal having the same BSS identifier information as that of the terminal without using a separately set CCA-SD threshold during the signal detection process. However, the terminal may avoid a collision with the wireless LAN signal having the different BSS identifier information from that of the terminal by using the predetermined CCA-ED threshold 10 for the energy detection.

Figure 11:
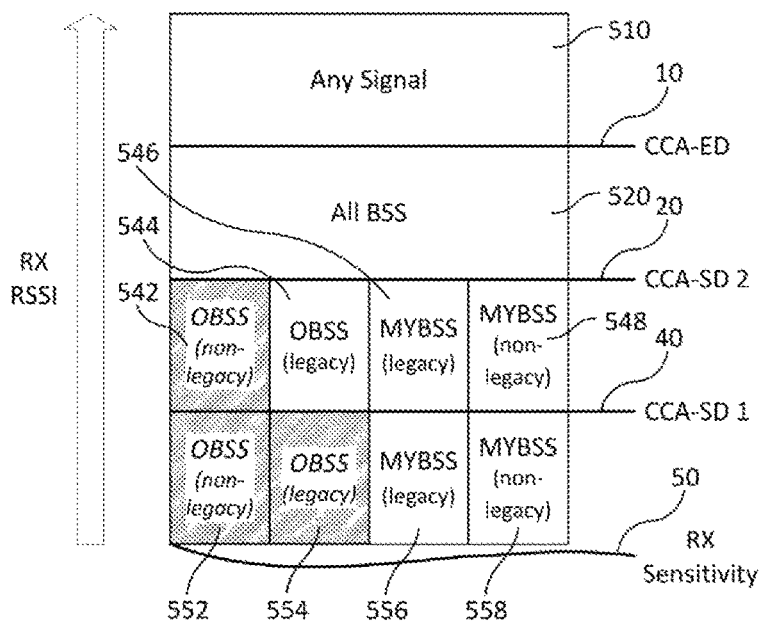
FIGS. 11 to 13 are diagrams illustrating another embodiment of a CCA method using whether to obtain non-legacy wireless LAN information from a received wireless signal and BSS identifier information.
Figure 12:
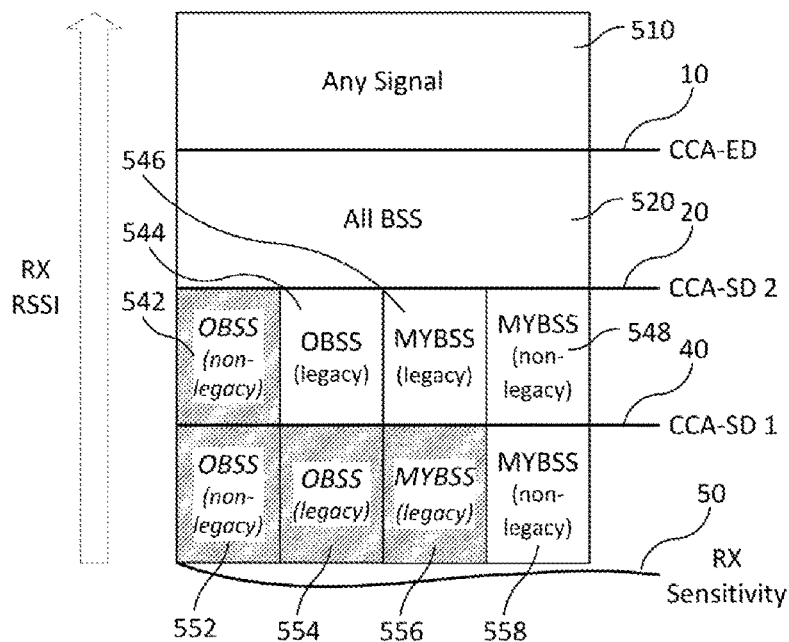
Figure 13:
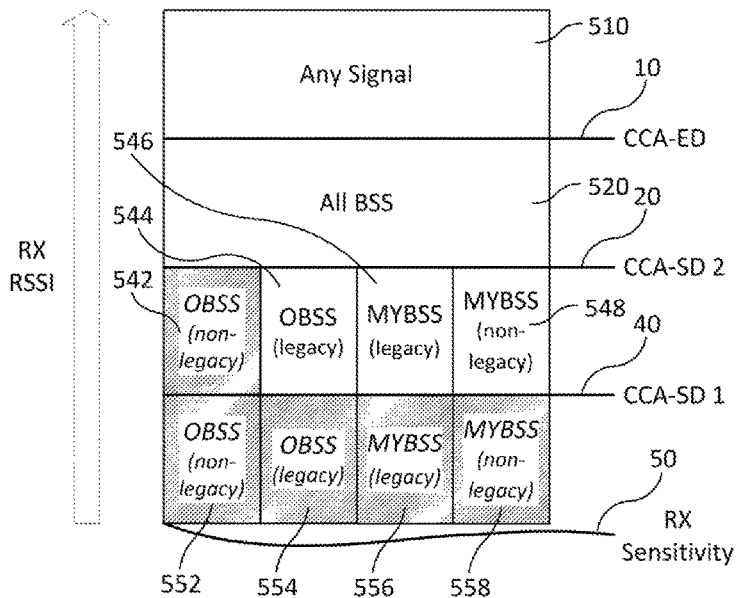

FIGS. 11 to 13 are diagrams illustrating yet another embodiment of a CCA method using whether to obtain non-legacy wireless LAN information and BSS identifier information. In each embodiment of FIGS. 11 to 13, the terminal may measure the RX RSSI of the received wireless signal and determine whether the corresponding signal is the wireless LAN signal. When the received signal is the wireless LAN signal having the BSS identifier information according to various embodiments to be described below, the terminal may extract the BSS identifier information from the corresponding signal and determine whether the extracted BSS identifier information is the same as the BSS identifier information of the corresponding terminal.

Moreover, the terminal may obtain at least one of the legacy wireless LAN information and the non-legacy wireless LAN information from the received wireless signal. As a result, the terminal may determine whether the received wireless signal is a signal including only the legacy wireless LAN information or a signal including both the legacy wireless LAN information and the non-legacy wireless LAN information. According to an embodiment, the terminal may obtain at least one of the legacy wireless LAN information and the non-legacy wireless LAN information by using preamble information of the received wireless signal. The BSS identifier information of the wireless signal may be extracted from the non-legacy wireless LAN information when the non-legacy wireless LAN information is obtained from the corresponding signal. However, the present invention is not limited thereto and according to various embodiments described below the BSS identifier information of the wireless signal may be also extracted from the legacy wireless LAN information. According to an embodiment of the present invention, the BSS identifier information which is referred to for executing the CCA is included in the non-legacy wireless LAN information, while the non-legacy wireless LAN information may not be included in the received wireless signal. That is, when the received wireless signal does not include the BSS identifier information which is referred to for executing the CCA according to the embodiment of the present invention, the BSS identifier information may not be extracted from the corresponding signal. In this case, the BSS identifier information of the corresponding signal for executing the CCA may be set to a predetermined value. In the embodiments of FIGS. 11 to 13, duplicative description of parts, which are the same as or correspond to the aforementioned embodiments, will be omitted.

First, referring to FIG. 11, when a received wireless signal of a specific channel is the wireless LAN signal having the RX RSSI of the RX sensitivity 50 or more and the first CCA-SD threshold 40 or less, whether the channel is busy is determined based on whether the corresponding signal is the wireless LAN signal having the same BSS identifier information as that of the terminal.

When the BSS identifier information extracted from the wireless signal is different from the BSS identifier information of the terminal (that is, in the case of OBSS wireless LAN signal), it is determined that the corresponding channel is in the idle state. In this case, the OBSS wireless LAN signal 552 may be divided into an OBSS non-legacy wireless LAN signal in which the non-legacy wireless LAN information may be obtained from the corresponding signal and an OBSS legacy wireless LAN signal in which the non-legacy wireless LAN information is not obtained from the corresponding signal. The terminal determines that the corresponding channel is in the idle state both in the case where the OBSS non-legacy wireless LAN signal is received and in the case where the OBSS legacy wireless LAN signal is received.

On the contrary, when the BSS identifier information extracted from the wireless signal is the same as the BSS identifier information of the terminal (that is, in the case of MYBSS wireless LAN signal), it is determined that the corresponding channel is in the busy state. Similarly, the MYBSS wireless signal may be divided into a MYBSS non-legacy wireless LAN signal 558 in which the non-legacy wireless LAN information may be obtained from the corresponding signal and an MYBSS legacy wireless LAN signal 556 in which the non-legacy wireless LAN information is not obtained from the corresponding signal. The terminal determines that the corresponding channel is in the busy state both in the case where the MYBSS non-legacy wireless LAN signal 558 is received and in the case where the MYBSS legacy wireless LAN signal 556 is received.

Meanwhile, when the received wireless signal of the specific channel is the wireless LAN signal having the RX RSSI between the first CCA-SD threshold 40 and the second CCA-SD threshold 20, whether the channel is busy is determined based on whether the corresponding signal includes the non-legacy wireless LAN information and whether the corresponding signal has the same BSS identifier information as that of the terminal. According to an embodiment, the first CCA-SD threshold 40 may be set to the same level as the CCA-SD threshold applied to the legacy terminal and the second CCA-SD threshold 20 may be set to a higher level than the first CCA-SD threshold 40 and equal to or lower than the CCA-ED threshold.

When the non-legacy wireless LAN information is obtained from the wireless signal and the BSS identifier information of the corresponding signal is different from the BSS identifier information of the terminal (that is, in the case of non-legacy OBSS signal 542), it is determined that the corresponding channel is in the idle state. However, in other cases, when the non-legacy wireless LAN information is not obtained from the wireless signal (that is, a legacy signal) or the BSS identifier information of the corresponding signal is the same as the BSS identifier information of the terminal (that is, a MYBSS signal), it is determined that the corresponding channel is in the busy state. In more detail, the case where it is determined that the channel is in the busy state includes i) a case where the non-legacy wireless LAN information is not obtained from the wireless signal and the BSS identifier information of the corresponding signal is different from the BSS identifier information of the terminal (that is, in the case of legacy OBSS signal 544), ii) a case where the non-legacy wireless LAN information is not obtained from the wireless signal and the BSS identifier information of the corresponding signal is the same as the BSS identifier information of the terminal (that is, in the case of legacy MYBSS signal 546), and iii) a case where the non-legacy wireless LAN information is obtained from the wireless signal and the BSS identifier information of the corresponding signal is the same as the BSS identifier information of the terminal (that is, in the case of non-legacy MYBSS signal 548).

That is, when the non-legacy wireless LAN information is not obtained from the wireless signal, it is determined that the corresponding channel is in the busy state, but when the non-legacy wireless LAN information is obtained from the wireless signal, whether the channel is busy is determined based on whether the BSS identifier information of the corresponding signal is the same as the BSS identifier information of the terminal. Therefore, according to the embodiment of the present invention, when the non-legacy wireless LAN information is obtained from the wireless signal, whether the corresponding channel is busy may be determined based on the BSS identifier information of the wireless signal. According to an embodiment, when the non-legacy wireless LAN information is not obtained from the wireless signal, the BSS identifier information which is referred to for executing the CCA of the present invention may not be extracted from the corresponding signal. In this case, the terminal may determine that the channel is in the busy state regardless of whether the BSS identifier information is extracted from the corresponding signal.

The signal detection process may be performed by referring to the preamble of the received wireless signal. According to an embodiment, when it is determined that the channel is in the busy state during the signal detection process, even though the RX RSSI decreases to the first CCA-SD threshold 40 or less while receiving the wireless signal which is being protected, the terminal may not access the channel during a frame transmission time of the wireless signal.

Meanwhile, when the received wireless signal of the specific channel is a wireless LAN signal 520 between the second CCA-SD threshold 20 and the CCA-ED threshold 10, it is determined that the corresponding channel is in the busy state. In this case, the terminal that receives the wireless LAN signal 520 determines that a channel where the corresponding signal is received is in the busy state regardless of whether the non-legacy wireless LAN information is obtained from the corresponding signal and furthermore, regardless of whether the corresponding signal is the wireless LAN signal having the same BSS identifier information as that of the terminal.

During the energy detection process, when the received wireless signal of the specific channel by the terminal is a wireless signal 510 of the CCA-ED threshold 10 or more, it is determined that the corresponding channel is in the busy state. As described above, in case that another type of wireless signal (other than the wireless LAN signal) is received as well, the terminal determines that the corresponding channel is in the busy state, if the RX RSSI of the wireless signal is the CCA-ED threshold 10 or more.

Next, according to the embodiment of FIG. 12, when a received wireless signal of a specific channel is the wireless LAN signal having the RX sensitivity 50 or more and the RX RSSI of the first CCA-SD threshold 40 or less, whether the channel is busy is determined based on whether the corresponding signal includes the non-legacy wireless LAN information and whether the corresponding signal has the same BSS identifier information as that of the terminal.

When the non-legacy wireless LAN information is obtained from the wireless signal and the BSS identifier information of the corresponding signal is the same as the BSS identifier information of the terminal (that is, in the case of non-legacy MYBSS signal 558), it is determined that the corresponding channel is in the busy state. However, in other cases, when the BSS identifier information of the wireless signal is different from the BSS identifier information of the terminal (that is, OBSS signal) or the non-legacy wireless LAN information is not obtained from the corresponding signal (that is, legacy signal), it is determined that the corresponding channel is in the idle state. In more detail, the case where it is determined that the channel is in the idle state includes i) a case where the non-legacy wireless LAN information is obtained from the wireless signal and the BSS identifier information of the corresponding signal is different from the BSS identifier information of the terminal (that is, in the case of non-legacy OBSS signal 552), ii) a case where the non-legacy wireless LAN information is not obtained from the wireless signal and the BSS identifier information of the corresponding signal is different from the BSS identifier information of the terminal (that is, in the case of legacy BSS signal 554), and iii) a case where the non-legacy wireless LAN information is not obtained from the wireless signal and the BSS identifier information of the corresponding signal is the same as the BSS identifier information of the terminal (that is, in the case of legacy MYBSS signal 556).

That is, when the non-legacy wireless LAN information is not obtained from the wireless signal, it is determined that the corresponding channel is in the idle state, but when the non-legacy wireless LAN information is obtained from the wireless signal, whether the channel is busy is determined based on whether the BSS identifier information of the corresponding signal is the same as the BSS identifier information of the terminal. According to the embodiment of FIG. 12, when the non-legacy wireless LAN information is obtained from the wireless signal and the BSS identifier information of the corresponding signal is different from the BSS identifier information of the terminal, a predetermined CCA threshold 20 may be used for the CCA of the corresponding channel. However, when the non-legacy wireless LAN information is obtained from the wireless signal and the BSS identifier information of the corresponding signal is the same as the BSS identifier information of the terminal, in the case where the corresponding signal has the RX RSSI of the RX sensitivity 50 or more, it may be determined that the corresponding channel is in the busy state without setting a separate CCA threshold. According to an embodiment, when the non-legacy wireless LAN information is not obtained from the wireless signal, the BSS identifier information which is referred to for executing the CCA of the present invention may not be extracted from the corresponding signal. In this case, the terminal may determine that the channel is in the idle state regardless of whether the BSS identifier information is extracted from the corresponding signal.

According to the embodiment of FIG. 12, even though the BSS identifier information which is referred to for executing the CCA is included in the non-legacy wireless LAN information and the received wireless LAN signal does not include the non-legacy wireless LAN information, the CCA may be efficiently executed. That is, when the received wireless signal is the legacy wireless LAN signal from which the BSS identifier information is not extracted, it is determined that the corresponding channel is in the idle state or the busy state in a lump according to the RX RSSI of the corresponding signal to minimize a time delay required to determine whether the BSS identifier of the legacy wireless LAN signal is actually the same as the BSS identifier of the terminal. That is, only when the received wireless signal is the non-legacy wireless LAN signal, the terminal additionally verifies the BSS identifier information to determine whether the channel is in the idle/busy state.

Next, according to the embodiment of FIG. 13, when the RX RSSI of a received wireless signal of a specific channel is the RX sensitivity 50 or more and the first CCA-SD threshold 40 or less, it is determined that the corresponding channel is in the idle state. In this case, the terminal determines that the corresponding channel is in the idle state regardless of whether the received signal includes the non-legacy wireless LAN information and whether the received signal has the same BSS identifier information as that of the terminal. Further, according to the embodiment of FIG. 13, when the non-legacy wireless LAN information is obtained from the wireless signal and the BSS identifier information of the corresponding signal is the same as the BSS identifier information of the terminal, a first CCA threshold may be used for the CCA of the corresponding channel. However, when the non-legacy wireless LAN information is obtained from the wireless signal and the BSS identifier information of the corresponding signal is different from the BSS identifier information of the terminal, a second CCA threshold having a higher level than the first CCA threshold may be used for the CCA of the corresponding channel.

According to the embodiment of FIG. 13, when the wireless LAN signal having the same BSS identifier information as that of the terminal is received, a problem of unfairness in that different CCA thresholds are applied according to whether the corresponding wireless LAN signal includes the non-legacy wireless LAN information may be resolved. That is, CCA thresholds for the legacy MYBSS signal and the non-legacy MYBSS signal are similarly applied to maintain fairness for channel occupation between a legacy terminal and a non-legacy terminal.

Meanwhile, in the embodiments of FIGS. 12 and 13, when the wireless signal having the RX RSSI of the first CCA-SD threshold 40 or more is received, a CCA process may be performed similarly to the embodiment of FIG. 11.

Figure 14:
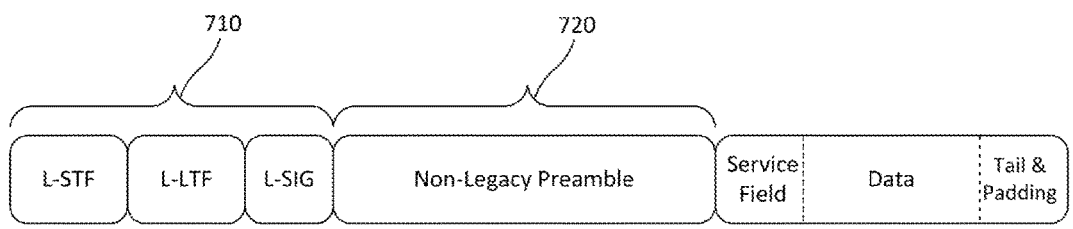
FIG. 14 is a diagram illustrating a frame structure of a wireless LAN signal according to an embodiment of the present invention.

FIG. 14 is a diagram illustrating a frame structure of a wireless LAN signal according to an embodiment of the present invention. Referring to FIG. 14, the wireless LAN signal according to the embodiment of the present invention may include a legacy preamble 710 for a legacy terminal (e.g. a terminal such as 802.11a/g, or the like) and a non-legacy preamble 720 for a non-legacy terminal (e.g. a terminal of 802.11ax). First, the legacy preamble 710 may include legacy wireless LAN information which the legacy terminal is able to decode, for instance, L-STF, L-LTF, L-SIG fields, and the like. Next, the non-legacy preamble 720 may include non-legacy wireless LAN information which only the non-legacy terminal is able to decode and the non-legacy wireless LAN information may not be decoded by the legacy terminal. Meanwhile, the legacy preamble 710 may include at least some of the non-legacy wireless LAN information which the non-legacy terminal is able to decode according to the embodiment. Moreover, the non-legacy preamble 720 may include at least one field of the legacy preamble 710, for instance, repeated information of a part or the entirety of the L-SIG field.

According to an embodiment of the present invention, the BSS identifier information which is referred to for executing the CCA may be included in the non-legacy preamble 720 as the non-legacy wireless LAN information. In this case, the BSS identifier information may be extracted from a predetermined bit filed of the non-legacy preamble 720. Meanwhile, according to another embodiment of the present invention, the BSS identifier information may be extracted from additional information of the legacy preamble 710. For example, the legacy preamble 710 may include the non-legacy wireless LAN information through an additional subcarrier set, and the like as described below and the BSS identifier information may be obtained from the non-legacy wireless LAN information included in the legacy preamble 710. According to yet another embodiment of the present invention, the BSS identifier information may be extracted from a predetermined bit field of the legacy preamble 710. In this case, the predetermined bit field of the legacy preamble 710 may be a bit field set for the legacy terminal and a value of the corresponding bit field may be used as the BSS identifier information under a specific condition as described below.

Figures 15, 16:
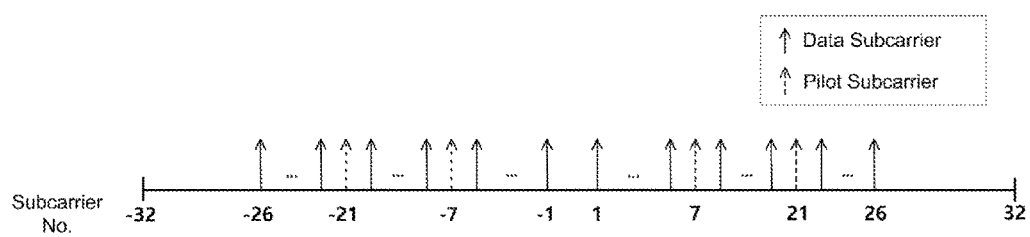
FIG. 15 is a diagram illustrating a method for representing BSS identifier information according to an embodiment of the present invention.
FIG. 16 is a diagram illustrating an embodiment of a subcarrier configuration used in a legacy preamble of a wireless LAN signal.

FIG. 15 illustrates a method for representing the BSS identifier information according to an embodiment of the present invention. According to the embodiment of the present invention, the BSS identifier information may be represented as a predetermined bit filed of the non-legacy preamble 720 of FIG. 14. According to an embodiment of the present invention, the BSS identifier information may be abbreviated information of a BSS identifier assigned to each BSS and may be information having smaller bits than the actual BSS identifier. For example, when the BSS identifier is represented as information of 24 bits in a specific wireless LAN system, the BSS identifier information may be represented as a bit filed having a predetermined length in the range of 1 bit to 23 bits. In the preset invention, the BSS identifier information is information acquired by classifying the actual BSS identifier into a predetermined category and may be named even as a BSS color. A method for obtaining a BSS color abbreviated from the BSS identifier includes a method using a combination of bit values at a predetermined location of the BSS identifier, a method using a result value acquired by applying a predetermined Hash function to the BSS identifier, and the like.

FIG. 15 as an embodiment thereof illustrates a result of acquiring the BSS color by using last 3 bit values of the BSS identifier. As such, the BSS color may be included in the preamble of the wireless LAN signal as information of a smaller amount than the actual BSS identifier, and as a result, each terminal may efficiently determine whether the received wireless LAN signal is a signal having the same BSS identifier as the corresponding terminal within a short time. The BSS identifier information may be represented as a predetermined bit of the non-legacy preamble.

Meanwhile, according to an embodiment of the present invention, the non-legacy preamble 720 may include the repeated L-SIG field and the repeated L-SIG field may be configured to have at least the some bits identical with the L-SIG field of the legacy preamble 710. In this case, the bits different from the L-SIG field of the legacy preamble 710 among the bits of the repeated L-SIG field may represent the BSS identifier information, bandwidth information of the system, non-legacy wireless LAN system information, channel information, and the like.

According to an additional embodiment of the present invention, additional information may be transmitted through a modulation method applied to the repeated L-SIG field. That is, the repeated L-SIG field may be represented as the same modulation value as the L-SIG field of the legacy preamble 710 or otherwise expressed as a counter modulation value. Herein, the counter modulation value may be represented through a phase shift between modulation symbols transmitted to the L-SIG of the legacy preamble 710 and modulation symbols of the repeated L-SIG and the additional information may be transmitted through a phase shift amount. In detail, when the L-SIG of the legacy preamble 710 and the repeated L-SIG are multiplied by (1, 1) to be transmitted, the symbols of both fields have the same phase and when the L-SIG of the legacy preamble 710 and the repeated L-SIG are multiplied by (1, −1) to be transmitted, a phase shift of 180° occurs between the symbols of the repeated L-SIG and the symbols of the legacy preamble 710. In this case, specific flag information for the non-legacy wireless LAN information may be determined according to whether the repeated L-SIG field is represented as the same modulation value as the L-SIG field of the legacy preamble 710, for example, whether a SIG-A field of the non-legacy preamble has a variable length, whether a SIG-B field is included in the non-legacy preamble, whether a specific bit field of the non-legacy preamble (alternatively, legacy preamble) represents the BSS identifier information, and the like may be determined.

Figures 17, 18:
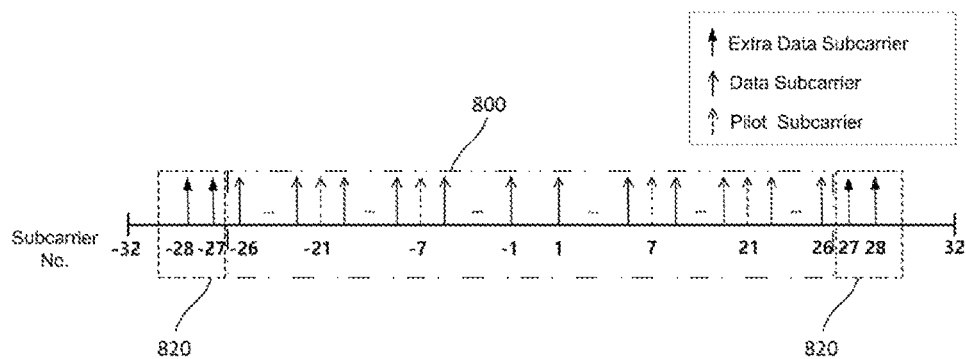
FIG. 17 is a diagram illustrating an embodiment of a subcarrier configuration used in a non-legacy wireless LAN signal.
FIG. 18 is a diagram illustrating a method for representing non-legacy wireless LAN information by using a predetermined bit field of the legacy preamble.

FIGS. 16 and 17 as another embodiment of the present invention illustrate a method for obtaining the non-legacy wireless LAN information by using an additional subcarrier set of the wireless LAN signal.

First, FIG. 16 illustrates an embodiment of a subcarrier configuration used in the legacy preamble of the wireless LAN signal. According to an embodiment of the present invention, the subcarrier set of the legacy preamble of the non-legacy wireless LAN signal may be configured equivalent to the subcarrier set of the legacy wireless LAN signal. That is, the subcarrier set of the legacy preamble may be constituted by a total of 52 subcarrier including 4 pilot subcarriers and 48 data subcarriers in a bandwidth of 20 MHz. In this case, when numbers of respective subcarriers are set to −26, −25, . . . , −2, −1, 1, 2, . . . , 25, and 26, subcarriers having numbers of −21, −7, 7, and 21 are used as the pilot subcarriers and subcarriers of the residual numbers are used as the data subcarriers. Such a basic configuration of the subcarrier is required to maintain mutual compatibility in an environment in which the legacy wireless LAN system (e.g. 802.11 a/g) and the non-legacy wireless LAN system (e.g. 802.11 ax, or the like) coexist. That is, the legacy preamble of the non-legacy wireless LAN signal as well as the legacy wireless LAN signal has the subcarrier configuration illustrated in FIG. 16 to provide backward compatibility to the legacy terminal.

FIG. 17 illustrates an embodiment of the subcarrier configuration used in the non-legacy wireless LAN signal. An additional subcarrier may be used without interference of an adjacent bandwidth in the non-legacy wireless LAN system with the development of a filter or an amplifier used in the terminal. Referring to FIG. 17, the subcarrier of the non-legacy wireless LAN signal according to the embodiment of the present invention may be configured to include a first subcarrier set 800 and a second subcarrier set 820. In more detail, the first subcarrier set 800 may be configured equivalent to the subcarrier set of the legacy wireless LAN signal illustrated in FIG. 16. Further, the second subcarrier set 820 as a subcarrier set different from the first subcarrier set 800 may include 4 extra subcarriers, two at each higher and lower indices of the first subcarrier set 800, according to an embodiment. According to the embodiment of FIG. 17, since the non-legacy wireless LAN signal uses pilot subcarriers at the same location and of the same number as the legacy wireless LAN signal, 52 data subcarriers which increase from the existing 48 subcarriers by 4 may be used. According to an embodiment, the subcarrier configuration may be used after a legacy preamble part of the non-legacy wireless LAN signal. The non-legacy terminal may obtain information through a total of 56 subcarriers in the respective non-legacy preamble and data field of the received non-legacy wireless LAN signal.

According to the embodiment of the present invention, the second subcarrier set 820 included in the non-legacy preamble may represent the BSS identifier information, the bandwidth information of the system, the non-legacy wireless LAN system information, the channel information, and the like. In this case, a separate parity bit for parity check of the second subcarrier set 820 may be included in the non-legacy preamble. According to an embodiment, when the non-legacy preamble includes the repeated L-SIG field as described above, the BSS identifier information, the bandwidth information of the system, the non-legacy wireless LAN system information, the channel information, and the like may be represented through the second subcarrier set 820 of the repeated L-SIG field.

Meanwhile, according to another embodiment of the present invention, the subcarrier configuration of FIG. 17 may be extensively applied to the legacy preamble of the non-legacy wireless LAN signal. That is, the legacy preamble of the non-legacy wireless LAN signal may additionally include the second subcarrier set 820 and transfer the non-legacy wireless LAN information through the second subcarrier set 820. In this case, the legacy terminal may not obtain information from the second subcarrier set 820, but the non-legacy terminal may obtain additional information from the second subcarrier set 820 of the legacy preamble.

For example, when it is assumed that the second subcarrier set 820 additionally used in the legacy preamble includes 4 subcarriers, the indices (that is, subcarrier numbers) of the corresponding subcarriers may be set to −28, −27, 27, and 28, respectively as illustrated in FIG. 17. In this case, when a BPSK modulation scheme is used in the legacy preamble and the same modulation scheme is applied to the second subcarrier set, information of a total of 4 bits may be additionally transmitted. Similarly, when a QPSK modulation scheme is applied to the second subcarrier set, information of a total of 8 bits may be additionally transmitted. In this case, the parity bit for parity check of the second subcarrier set included in the legacy preamble may be included in the non-legacy preamble.

According to an additional embodiment of the present invention, only some of total bits which may be represented by the second subcarrier set 820 of the legacy preamble may be used for transmitting the additional information. For example, only some bits of the second subcarrier set 820 may be used for transmitting the additional information for compatibility with the parity check of the legacy preamble. That is, the information added to the second subcarrier set 820 may be configured to have even parities for compatibility with the parity bit used in the existing L-SIG and when the BPSK modulation scheme is used, information which may be transferred through the second subcarrier set 820 may be information of a total of 3 bits such as 1010, 0101, 1100, 0011, 1001, 0110, 1111, and 0000.

According to another embodiment, a specific bit of the second subcarrier set 820 may be used as the parity check bit and the residual bits may be used for transmitting the additional information. For example, 3 bits among 4 bits of the second subcarrier set 820 may be used for transmitting the additional information and 1 bit may be used as the parity bit. In this case, the parity bit of the second subcarrier set 820 may be used for the parity check for bits added by the second subcarrier set 820 or otherwise used for parity check of the entire L-SIG including the second subcarrier set 820. In this case, the parity check with respect to the legacy wireless LAN signal may be performed by using the existing parity bit of the L-SIG and the parity check with respect to the non-legacy wireless LAN signal is performed by using both the existing parity bit of the L-SIG and the parity bit of the second subcarrier set 820 to achieve parity check with higher-reliability. According to yet another embodiment, the parity check with respect to the non-legacy wireless LAN information added by the second subcarrier set 820 may be performed by using a reserved bit of the L-SIG.

When the additional information for the non-legacy terminal is transmitted through the second subcarrier set 820 of the legacy preamble, the non-legacy terminal may more rapidly obtain the additional information in the legacy preamble of the received wireless LAN signal, thus an initial access delay or detection of a preamble, a header, and a packet which are not required may be reduced by using the obtained additional information. Further, according to the embodiment of the present invention, the non-legacy terminal may obtain the non-legacy wireless LAN information from the second subcarrier set 820 of the legacy preamble and the non-legacy wireless LAN information obtained in that case may include the BSS identifier information, the bandwidth information of the system, the non-legacy wireless LAN system information, the channel information, and the like. When the non-legacy terminal obtains the second subcarrier set 820 in the legacy preamble of the received wireless LAN signal, the non-legacy terminal may recognize that the corresponding wireless LAN signal includes the non-legacy wireless LAN information.

In the embodiment of FIG. 17, the embodiment in which 4 additional data subcarriers are included in the second subcarrier set 820 is described, but the present invention is not limited thereto and different numbers of subcarriers may be included in a second subcarrier set 820. Further, the embodiment of FIG. 17 may be applied to a case where other bandwidths including 40 MHz, 80 MHz, and 160 MHz are used as well as a case where a bandwidth of the wireless LAN signal is 20 MHz.

FIG. 18 as yet another embodiment illustrates a method for representing the non-legacy wireless LAN information by using a predetermined bit field of the legacy preamble. According to an additional embodiment of the present invention, the non-legacy wireless LAN information may be extracted from the predetermined bit field of the legacy preamble under a specific condition. FIG. 18 as an embodiment thereof illustrates a rate bit field included in the L-SIG of the legacy preamble. As illustrated in FIG. 18, a 4-th bit in the rate bit filed of the existing legacy preamble is continuously set to 1. Therefore, information on a data rate, a modulation scheme, and a coding rate of the legacy wireless LAN signal may be obtained through former 3 bit values in the rate bit field. Accordingly, according to the embodiment of the present invention, whether the corresponding rate bit field represents the non-legacy wireless LAN information may be decided based on the 4-th bit value of the rate bit field. That is, when the 4-th bit of the rate bit field has a value of 1, the corresponding rate bit field may represent the existing information, that is, the data rate, the modulation scheme, and the coding rate. However, when the 4-th bit of the rate bit field has a value of 0, the corresponding rate bit field may represent the non-legacy wireless LAN information.

When it is determined that the rate bit field includes the non-legacy wireless LAN information, the BSS identifier information may be extracted from former 3 bit values of the corresponding rate bit field as illustrated in FIG. 18. However, the present invention is not limited thereto and the non-legacy wireless LAN information such as bandwidth information, channel information, an association identifier (AID), and the like of the non-legacy wireless LAN signal may be extracted from the rate bit field. In this case, actual rate information for the non-legacy terminal may be transmitted through the non-legacy preamble. Meanwhile, even when the rate bit field includes the non-legacy wireless LAN information, the legacy terminal may analyze the non-legacy wireless LAN information as rate information. For such a situation, by appropriately configuring a length field of the L-SIG, the legacy terminals may perform a transmission delay (NAV configuration, and the like) by using L-SIG length information of other terminal packets when the transmission delay is required due to transmission of other terminals. In more detail, since the length field of the legacy preamble represents the size (the number of bytes) of transmission data, when information on the number of transmitted bits per OFDM symbol is obtained based on a modulation and coding scheme (MCS) and the length field is divided by the obtained information, the number of required OFDM symbols is determined. In this case, the network allocation vector (NAV) configuration may be performed according to the obtained number of OFDM symbols, and when the rate bit field is used as the non-legacy wireless LAN information in accordance with the embodiment of the present invention, the NAV may be configured as large as a required length by adjusting the length field.

As such, according to the embodiment of the present invention, based on information on predetermined specific bits of the legacy preamble, whether the corresponding legacy preamble includes the non-legacy wireless LAN information may be determined. When it is determined that the legacy preamble includes the non-legacy wireless LAN information, the non-legacy wireless LAN information such as the BSS identifier information, and the like may be extracted from the predetermined bit field of the legacy preamble, for instance, the rate bit field.

Meanwhile, according to an additional embodiment of the present invention, information on more bits may be secured by using a combination of the second subcarrier set of the legacy preamble and the specific bit field (that is, rate bit field), and as a result, the non-legacy wireless LAN information may be transferred. For example, when the legacy preamble is configured to additionally include the second subcarrier set, the non-legacy terminal may determine that the corresponding legacy preamble includes the non-legacy wireless LAN information and extract the BSS identifier information from all or some of 4 bits in the rate bit field. Furthermore, when the legacy preamble is configured to additionally include the second subcarrier set, the non-legacy terminal may analyze the entirety of the L-SIG bit field of the legacy preamble as the non-legacy wireless LAN information. As such, according to the embodiment of FIG. 18, since at least some of non-legacy wireless LAN information such as the BSS identifier information, and the like may be obtained from the legacy preamble before checking the non-legacy preamble, the CCA may be performed within a shorter time.

Figure 19:
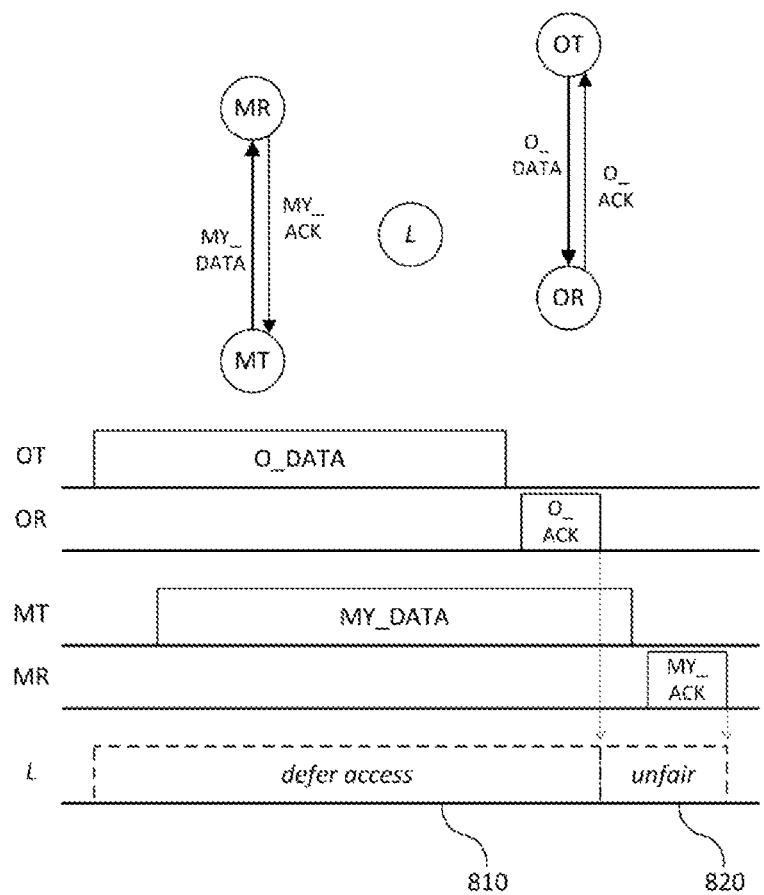
FIG. 19 is a diagram illustrating the unfairness problem of a legacy terminal that may occur if an adjusted CCA threshold is used for channel access according to an embodiment of the present invention.

FIG. 19 is a diagram illustrating the unfairness problem of a legacy terminal that may occur if an adjusted CCA threshold is used for channel access according to an embodiment of the present invention. According to the embodiment of FIG. 19 and the following embodiments, a MYBSS Transmitter (MT) and a MYBSS Receiver (MR) represent a transmission terminal and a reception terminal of a first BSS (e.g., a MYBSS), respectively, and an OBSS Transmitter (OT) and an OBSS Receiver (OR) represent a transmission terminal and a reception terminal of a second BSS (e.g., an OBSS) different from the first BSS. It is also assumed that an MT, an MR, an OT and an OR are non-legacy terminals and an L is a legacy terminal.

As shown in FIG. 19, in the OBSS, the terminal OT may transmit data O_DATA to the terminal OR and the terminal OR may transmit a response message O_ACK to the terminal OT in response to the received data O_DATA. In this case, if the received signal strength of the wireless signal O_DATA is higher than the first CCA threshold CCA-SD 1, the legacy terminal L located around the terminals OT and OR determines that a channel is busy, and do not perform channel access. In this case, the channel access delay period 810 of the legacy terminal L may be set to a time until the transmission of the response message O_ACK of the terminal OR is completed.

On the other hand, the terminal MT of the MYBSS different from the OBSS determines whether the channel is busy based on the received signal strength of the wireless signal O_DATA and BSS identifier information of the corresponding signal, as in the above embodiment. That is, if the BSS identifier information of the received wireless signal O_DATA is different from the BSS identifier information of the corresponding terminal, the terminal MT performs CCA based on the second CCA threshold CCA-SD 2. In this case, the second CCA threshold CCA-SD 2 has a higher level than the first CCA threshold CCA-SD 1 used in the legacy terminal. Therefore, if it is assumed that O_DATA is received respectively by the legacy terminal L and the non-legacy terminal MT as the received signal strength between the first CCA threshold CCA-SD 1 and the second CCA threshold CCA-SD 2, the channel access of the legacy terminal L is postponed but the channel access of the non-legacy terminal MT is allowed.

In such a way, if the received signal strength of O_DATA is lower than the second CCA threshold CCA-SD 2, the terminal MT determines that the channel is in an idle state and performs channel access. That is, the terminal MT performs a backoff procedure and transmits data MY_DATA when the backoff counter of the backoff procedure expires. In addition, the terminal MR receiving MY_DATA from the terminal MT transmits a response message MY_ACK in response thereto. In this case, if the transmission of the wireless signals MY_DATA and MY_ACK exchanged between the terminals MT and MR ends later than a channel access delay period 810 set in the legacy terminal L, the legacy terminal L may not access the channel even during an additional period 820 after the channel access delay period 810. Such a problem may occur not only in a single MAC Protocol Data Unit (MPDU) transmission but also in transmission situations based on transmission opportunity (TXOP) or aggregate MPDU (A-MPDU).

FIGS. 20 to 23 illustrate the data transmission method of a non-legacy terminal for solving the channel access delay problem of a legacy terminal.

Figure 20:
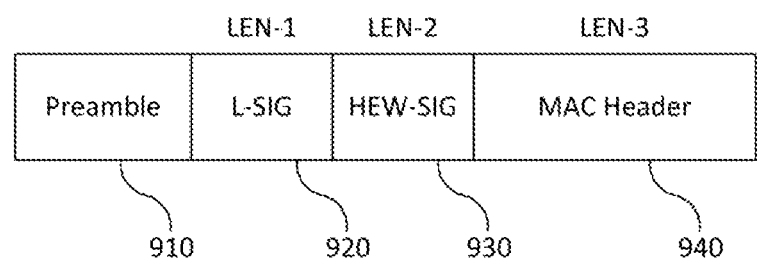
FIGS. 20 to 23 are diagrams illustrating the data transmission method of a non-legacy terminal for solving the channel access delay problem of a legacy terminal.

First, FIG. 20 illustrates a frame structure of a non-legacy wireless LAN signal according to an embodiment of the present invention. Referring to FIG. 20, the non-legacy wireless LAN signal includes a preamble 910, an L-SIG field 920 for a legacy terminal (e.g., an 802.11a/g terminal), a HEW-SIG field 930 for a non-legacy terminal (e.g., an 802.11ax terminal), and a MAC header 940. In an embodiment of the present invention, the L-SIG field 920 may represent at least a portion of a legacy preamble and the HEW-SIG field 930 may represent at least a portion of a non-legacy preamble. According to an embodiment of the present invention, the L-SIG field 920, the HEW-SIG field 930, and the MAC header 940 each includes length information indicating the transmission length of data. In the present invention, length information included in the L-SIG 920 is referred to as LEN-1, length information included in the HEW-SIG 930 is referred to as LEN-2, length information included in the MAC header 940 is referred to as LEN-3, respectively. According to an embodiment of the present invention, LEN-1 may represent a length field of L-SIG 920, LEN-2 may represent a length field of HEW-SIG 930, and LEN-3 may represent a duration field of the header 940, but the present invention is not limited thereto.

According to an embodiment of the present invention, LEN-1 represents length information of a corresponding frame. In this case, the length information of the frame may be represented by time information required for frame transmission, or may be represented by data size (byte number) information in which the time required for the transmission can be inferred in combination with other information. On the other hand, LEN-2 may represent length information until the transmission of a corresponding frame and frames related thereto are completed. Here, the related frames include a subsequent frame of the corresponding frame. According to another embodiment of the present invention, LEN-2 may represent length information until the next contention window interval is activated after the transmission of a corresponding frame and frames related thereto is completed. Here, the related frames include not only a subsequent frame of the corresponding frame but also a response (ACK) frame corresponding to each transmitted frame. In such a way, the length information represented by LEN-2 is referred to as "total transmission length information" in an embodiment of the present invention. According to an embodiment, LEN-2 may represent information of the duration field of the corresponding frame or may represent length information of transmission opportunity (TXOP) guaranteed to a terminal transmitting the corresponding frame. Finally, LEN-3 represents an arbitrary length defined by MAC.

On the other hand, information represented by LEN-1 and LEN-2 is not limited to the above description, and may be modified by other methods. That is, in an embodiment of the present invention, at least one of LEN-1 and LEN-2 may represent the total transmission length information. If LEN-1 represents length information (e.g., total transmission length information) that exceeds the length of a corresponding frame, the corresponding frame may further include L-SIG Length Extend (LLE) information indicating the length information. In the same manner, if LEN-2 represents length information (e.g., total transmission length information) that exceeds the length of a corresponding frame, the corresponding frame may further include HEW-SIG Length Extend (HLE) information indicating the length information.

When a terminal having data to be transmitted receives a non-legacy wireless LAN signal (i.e., a non-legacy wireless LAN signal of other BSS) having BSS identifier information different from that of the corresponding terminal, the terminal may perform channel access based on a CCA procedure according to the above-mentioned embodiment. In this case, according to an embodiment of the present invention, the terminal uses at least one of LEN-1, LEN-2 and LEN-3 of the received non-legacy wireless LAN signal of other BSS to adjust a data transmission period of the corresponding terminal. If the terminal transmits a single frame, the data transmission period may represent the duration of the corresponding frame. If the terminal continuously transmits a plurality of frames, the data transmission period may represent a transmission opportunity (TXOP) of the corresponding terminal. A specific embodiment of this will be described with reference to FIGS. 21 to 23.

Figure 21:
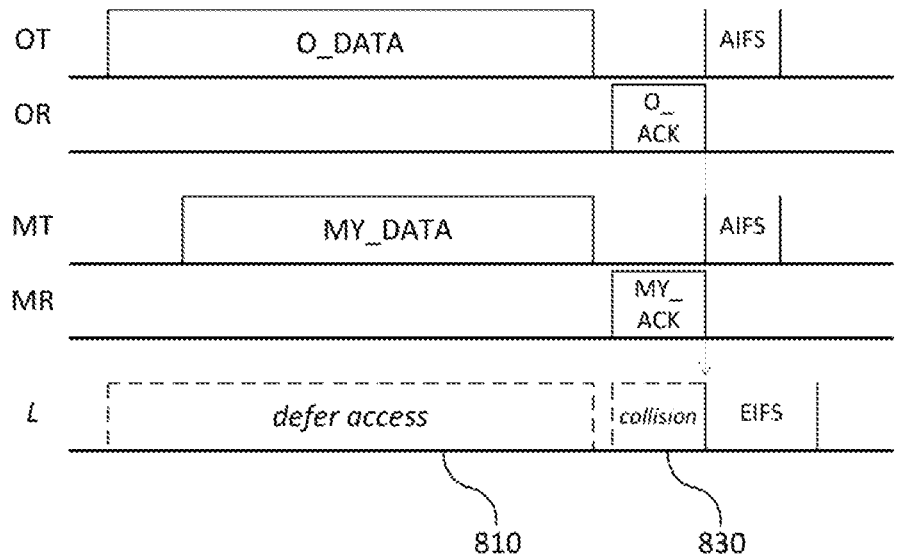

First, FIG. 21 illustrates an embodiment in which the data transmission period of a terminal is adjusted based on the length information of a received wireless LAN signal. Referring to FIG. 21, the terminal OT of the OBSS transmits data O_DATA to the terminal OR, and the terminal OR transmits a response message O_ACK to the terminal OT in response to the received data O_DATA. When the terminal MT transmits the data MY_DATA while the data O_DATA is transmitted, the terminal MT extracts the length information LEN(O_DATA) from the received wireless signal O_DATA and adjusts the transmission period of the data MY_DATA based on the extracted length information LEN (O_DATA). In this case, the extracted length information LEN(O_DATA) includes at least one of LEN-1, LEN-2 and LEN-3 extracted from O_DATA. In the embodiment of FIG. 21, LEN-1 may represent length information of O_DATA, and LEN-2 may represent total transmission length information of O_DATA+SIFS+O_ACK.

According to the embodiment of FIG. 21, the terminal MT adjusts the transmission period of the MY_DATA being transmitted by the corresponding terminal to be terminated simultaneously or before the transmission completion time point of the wireless signal O_DATA, based on the length information LEN(O_DATA) extracted from the wireless signal O_DATA. That is, the terminal MT adjusts the length of MY_DATA being transmitted by the corresponding terminal to be LEN(O_DATA) or less. The wireless LAN data MY_DATA of the terminal MT may be transmitted in the form of a PLCP Protocol Data Unit (PPDU), and the terminal MT may adjust the length of the wireless LAN data MY_DATA through various methods. For example, if the PPDU is composed of a single MAC Protocol Data Unit (MPDU), the terminal MT may perform fragmentation on the corresponding MPDU based on the extracted length information to reduce the length of MY_DATA. In addition, if the PPDU is composed of aggregate MPDU (A-MPDU), the terminal MT may limit the number of MPDUs included in the A-MPDU, or may perform fragment on an individual MPDU based on the extracted length information to reduce the length of MY_DATA. According to an embodiment, the terminal MT may refer to LLE information and/or HLE information of O_DATA when adjusting the length of MY_DATA.

On the other hand, in the embodiment of FIG. 21, when the transmission period of MY_DATA ends at the same time as the transmission completion time point of O_DATA, the response message MY_ACK of the terminal MR and the response message O_ACK of the terminal OR are simultaneously transmitted. However, when MY_ACK and O_ACK are simultaneously received by the legacy terminal L, the legacy terminal L recognizes that a collision 830 between data occurs. Therefore, after the transmission of the response messages MY_ACK and O_ACK is terminated, the legacy terminal L may have a problem of accessing the channel after extended inter frame spacing (EIFS) longer than AIFS.

Figure 22:
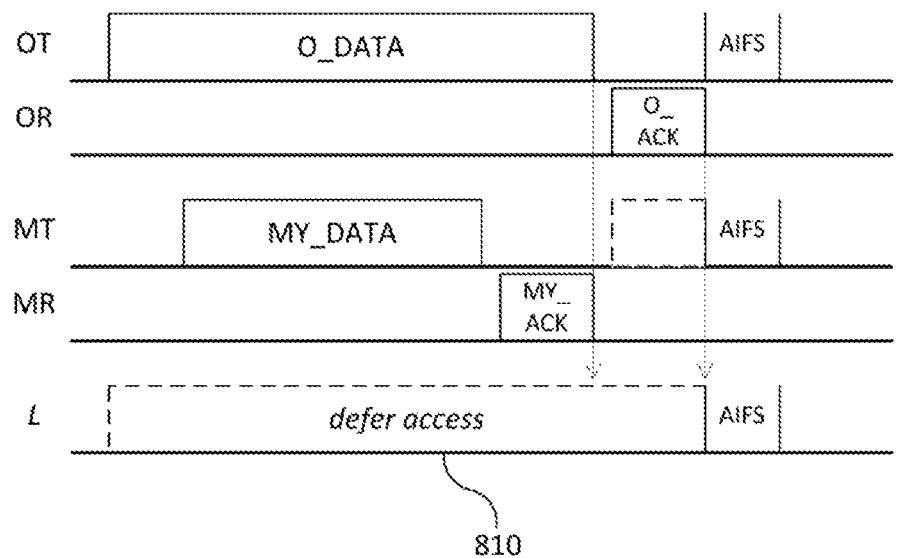

Next, FIG. 22 illustrates another embodiment in which the data transmission period of a terminal is adjusted based on the length information of a received wireless LAN signal. In the embodiment of FIG. 22, duplicative description of parts, which are the same as or correspond to the embodiment of FIG. 21, will be omitted.

According to the embodiment of FIG. 22, the terminal MT adjusts the transmission period of MY_DATA being transmitted by the corresponding terminal to be terminated before the transmission completion time point of the wireless signal O_DATA, based on the length information LEN (O_DATA) extracted from the wireless signal O_DATA. That is, the terminal MT adjusts the length of MY_DATA being transmitted by the corresponding terminal to be less than LEN(O_DATA). More specifically, referring to FIG. 22, the terminal MT sets the length of MY_DATA to LEN(O_DATA)–LEN(MY_ACK)–SIFS or less. Here, LEN (MY_ACK) represents the length of MY_ACK. That is, the terminal MT sets the transmission period of MY_DATA to be terminated earlier than the transmission completion time point of O_DATA by the sum of a SIFS time and a time required for the transmission of the response message MY_ACK. Therefore, in the embodiment of FIG. 22, the transmission of MY_DATA and the corresponding MY_ACK ends within the transmission period of O_DATA.

On the other hand, the terminal MT, the terminal MR, or other terminals in the MYBSS may attempt to transmit data while O_ACK is transmitted. According to an embodiment, arbitrary information may be inserted into predetermined specific messages such as request-to-send (RTS), clear-to-send (CTS), and ACK messages. In this case, when a message including the corresponding information is received, the adjustment of a CCA threshold according to the above-described embodiment may not be allowed. That is, terminals of other BSS receiving the message perform channel access based on the first CCA threshold CCA-SD 1 rather than the second CCA threshold CCA-SD 2.

In such a manner, according to the embodiment of FIG. 22, all terminals including the legacy terminal attempt channel access when the channel is in an idle state for an AIFS time after the O_ACK transmission of the terminal OR is completed. Therefore, a fair opportunity of channel accesses between the non-legacy terminal and the legacy terminal may be guaranteed.

Figure 23:
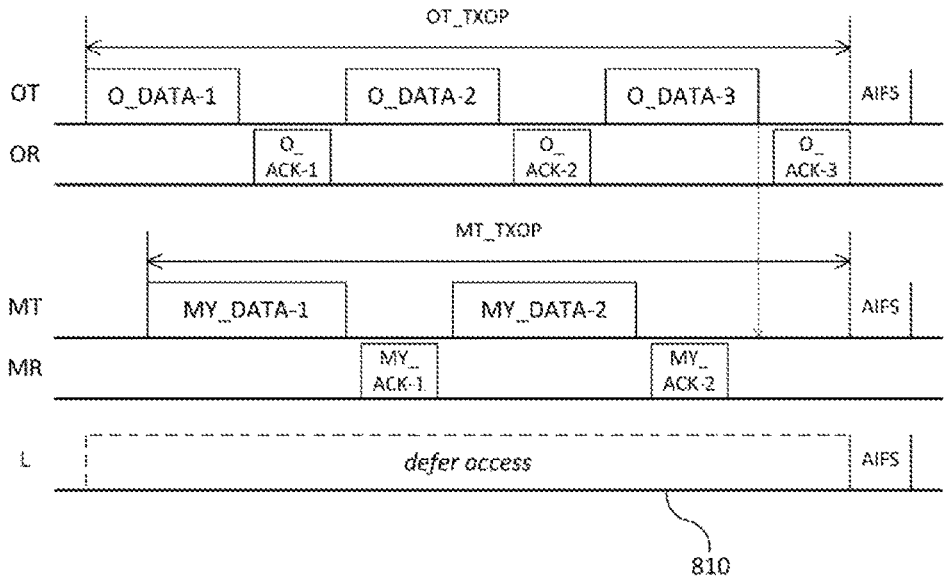

FIG. 23 illustrates another embodiment in which the data transmission period of a terminal is adjusted based on the length information of a received wireless LAN signal. In the embodiment of FIG. 23, duplicative description of parts, which are the same as or correspond to the embodiments of FIGS. 21 and 22, will be omitted.

According to the embodiment of FIG. 23, the terminal OT of the OBSS continuously transmits a plurality of data O_DATA-1, O_DATA-2, and O_DATA-3 during the TXOP period OT_TXOP allocated to the corresponding terminal. In the case of a Quality of Service (QoS) terminal that transmits video data, voice data, and the like, a plurality of data including at least one subsequence frame may be continuously transmitted during a TXOP period allocated to the corresponding terminal. In addition, the terminal OR receiving a plurality of data from the terminal OT transmits response messages O_ACK-1, O_ACK-2, and O_ACK-3 corresponding to each received frame. The transmission of a plurality of data and response messages corresponding thereto is completed within the TXOP period OT_TXOP allocated to the terminal OT.

When the terminal MT transmits data while the terminal OT transmits a plurality of data, the terminal MT extracts length information from at least one of the plurality of data O_DATA-1, O_DATA-2 and O_DATA-3, and adjusts the data transmission period of the corresponding terminal based on the extracted length information. In this case, the terminal MT may extract the length information from the received data of the terminal OT in the process of performing CCA for data transmission of the corresponding terminal. If the terminal MT transmits single data, the data transmission period may mean duration of the corresponding data frame. If the terminal MT continuously transmits a plurality of data, the data transmission period may mean a transmission opportunity (TXOP) of the corresponding terminal.

When the terminal MT transmits data during the transmission of O_DATA-1 as in the embodiment of FIG. 23, the terminal MT extracts length information LEN(O_DATA-1) from O_DATA-1 and adjusts the data transmission period of the corresponding terminal MT based on the extracted length information LEN(O_DATA-1). In this case, the extracted length information LEN(O_DATA-1) includes at least one of LEN-1, LEN-2 and LEN-3 extracted from O_DATA-1. In the embodiment of FIG. 23, LEN-1 may represent the length of data O_DATA-1 where corresponding length information is extracted, LEN-2 may represents the length of a TXOP period OT_TXOP, that is, (O_DATA-1+SIFS+O_ACK-1)+SIFS+(O_DATA-2+SIFS+O_ACK-2)+SIFS+ . . . SIFS+(O_DATA-n+SIFS+O_ACK-n), which is allocated to the terminal OT that transmits the corresponding data O_DATA-1. Additionally, LEN-3 represents an arbitrary length defined by MAC.

As described above, the information represented by LEN-1 and LEN-2 is not limited thereto and may be modified through other methods. For example, LEN-1 may represent the length of the TXOP period OT_TXOP allocated to the terminal OT that transmits the corresponding data O_DATA-1. If LEN-1 represents length information (for example, total transmission length information) exceeding the length of the corresponding data O_DATA-1, O_DATA-1 may further include L-SIG Length Extend (LLE) information indicating this. In the same manger, If LEN-2 represents length information (for example, total transmission length information) exceeding the length of the corresponding data O_DATA-1, O_DATA-1 may further include HEW-SIG Length Extend (HLE) information indicating this.

According to the embodiment of FIG. 23, the terminal MT adjusts the data transmission period of the terminal MT to be terminated before the data transmission completion time point of the terminal OT, based on the extracted length information LEN(O_DATA-1). When a terminal continuously transmits a plurality of data as in the embodiment of FIG. 23, the length of the TXOP period MT_TXOP allocated to the terminal MT, that is, (MY_DATA-1+SIFS+MY_ACK-1)+SIFS+(MY_DATA-2+SIFS+MY_ACK-2)+SIFS+ . . . +SIFS+(MY_DATA-m+SIFS+MY_ACK-m), may be set shorter than the length of the TXOP period OT_TXOP allocated to the terminal OT. More specifically, referring to FIG. 23, the length of the TXOP period MT_TXOP allocated to the terminal MT may be set to OT_TXOP−LEN(O_ACK)−SIFS or less. That is, the terminal MT adjusts the total sum of the lengths of one or a plurality of data transmitted by the corresponding terminal to be equal to or smaller than LEN-2(O_DATA-1)−LEN(O_ACK-n)−LEN(MY_ACK-m)−SIFS. Here, it is assumed that OT_TXOP information is extracted from LEN-2 of O_DATA-1, and LEN-2(O_DATA-1) represents the extracted LEN-2 information. Also, LEN(O_ACK-n) represents the length of a response message to the last transmission data O_DATA-n of the terminal OT, and LEN(MY_ACK-m) represents the length of a response message to the last transmission data (MY_DATA-m) of the terminal MT.

Accordingly, in the embodiment of FIG. 23, the transmission of one or a plurality of data MY_DATA-1 and MY_DATA-2 transmitted by the terminal MT and response messages MY_ACK-1 and MY_ACK-2 corresponding thereto is completed within the TXOP period OT_TXOP allocated to the terminal OT. All terminals including the legacy terminals attempt to access the channel when the channel is in an idle state for an AIFS time after the transmission of the last response message O_ACK-n of the terminal OR is completed. Therefore, a fair opportunity of channel accesses between the non-legacy terminal and the legacy terminal may be guaranteed.

As described above, according to an embodiment of the present invention, the terminal MT may determine the data transmission period of the corresponding terminal by using the length information LEN-1 or LEN-2 extracted from the L-SIG field or the HEW-SIG field of the received wireless signal O_DATA. In this case, the terminal MT may adjust the data transmission period of the corresponding terminal in a short time before decoding the MAC header of the O_DATA.

Figure 24:
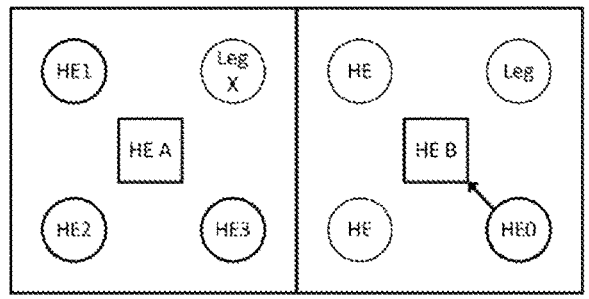
FIG. 24 is a diagram illustrating another embodiment of the present invention to solve the unfairness problem of a legacy terminal that may occur if an adjusted CCA threshold is used for channel access.
Figure 24:
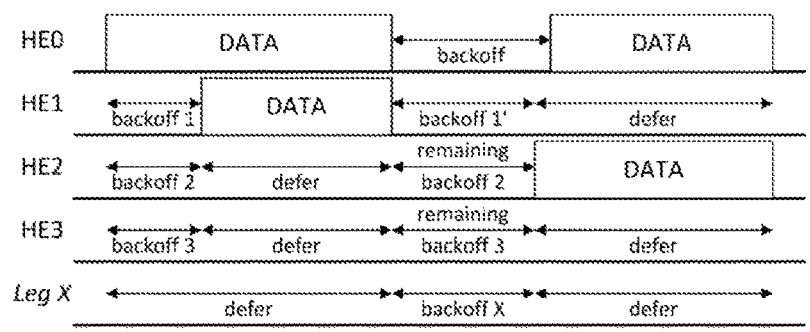

FIG. 24 illustrates another embodiment of the present invention to solve the unfairness problem of a legacy terminal that may occur if an adjusted CCA threshold is used for channel access. In the embodiment of FIG. 24, HE, HE0, HE1, HE2, HE3, HE A, and HE B represent non-legacy terminals, respectively, and Leg and Leg X represent legacy terminals. In addition, terminals HE1, HE2, HE3, and Leg X are associated with a first BSS operated by HE A, and terminal HE, HE0, and Leg are associated with a second BSS operated by HE B.

In the embodiment of FIG. 24, when the terminal HE0 of the second BSS transmits data, the signal of the corresponding data may be detected by the terminals of the adjacent first BSS. When the wireless signal of other BSS is detected in such a way, the non-legacy terminals HE1, HE2, and HE3 of the first BSS perform CCA based on the second CCA threshold CCA-SD 2 described above, and the legacy terminal Leg X performs CCA based on the first CCA threshold CCA-SD 1. When it is assumed that the data of the terminal HE0 is received by the respective terminals as the received signal strength between the first CCA threshold CCA-SD1 and the second CCA threshold CCA-SD2, the non-legacy terminals HE1, HE2, and HE3 may perform backoff procedures by reducing backoff counters backoff 1, backoff 2, and backoff 3 assigned to the corresponding terminals. However, the legacy terminal Leg X may not perform a backoff procedure and defer the channel access, resulting in unfairness problem.

In addition, when the data transmission of the terminals HE0 and HE1 is completed and the channel becomes in an idle state, the non-legacy terminals HE2 and HE3 respectively resume backoff procedures by using the remaining backoff counters, for example, the remaining backoff 2 and the remaining backoff 3 from previous backoff procedures. However, since the legacy terminal Leg X filed to reduce the backoff counter during the previous backoff procedure of the non-legacy terminals, it resumes the backoff procedure by using the backoff counter backoff X previously assigned to the corresponding terminal. Therefore, the legacy terminal has less probability of accessing the channel than the non-legacy terminal even in the subsequent contention window interval.

In order to solve such a problem, according to an embodiment of the present invention, by adjusting a backoff counter used in a backoff procedure of non-legacy terminals in a spatial reuse period, the fairness of channel accesses between the non-legacy terminals and the legacy terminals may be maintained. In the present invention, the spatial reuse period refers to a period in which channel access is performed based on an adjusted CCA threshold when the BSS identifier information of a received wireless signal is different from the BSS identifier information of a terminal.

In the spatial reuse period, the non-legacy terminals HE1, HE2, and HE3 of the first BSS perform CCA based on the second CCA threshold CCA-SD 2. If it is determined that the corresponding channel is in an idle state as a result of the CCA, the non-legacy terminals perform backoff procedures by using backoff counters assigned to each terminal. In the embodiment of FIG. 24, the terminal HE1 whose backoff counter expires first transmits data during the performing of the backoff procedures. In this case, the backoff procedures of the remaining terminals HE2 and HE3 are suspended.

If such a backoff procedure is suspended, the non-legacy terminal may adjust the backoff counter assigned to the corresponding terminal. The non-legacy terminal may resume the backoff procedure by using the adjusted backoff counter when the corresponding channel becomes in an idle state again. According to an embodiment, the non-legacy terminal may restore the backoff counter that is reduced during the backoff procedure in the spatial reuse period to a value before the backoff procedure. According to another embodiment, the non-legacy terminal may be assigned a new backoff counter if the backoff procedure is suspended in the spatial reuse period. Such an adjustment of the backoff counter may be performed when the received signal strength of a wireless signal having BSS identifier information different from that of the corresponding terminal is between the first CCA threshold CCA-SD 1 and the second CCA threshold CCA-SD 2.

On the other hand, according to another embodiment of the present invention, the non-legacy terminal may perform channel access by using a plurality of backoff counters. For example, the non-legacy terminal may be assigned a first backoff counter and a second backoff counter for the backoff procedure. In this case, the non-legacy terminal performs the backoff procedure by using at least one of the first backoff counter and the second backoff counter based on the received signal strength of the received wireless signal. For example, the non-legacy terminal may consume the first backoff counter when the received signal strength of a wireless signal having BSS identifier information different from that of the corresponding terminal is lower than the first CCA threshold CCA-SD 1. And the non-legacy terminal may consume the second backoff counter when the received signal strength of the wireless signal is between the first CCA threshold CCA-SD 1 and the second CCA threshold CCA-SD 2. The non-legacy terminal may transmit data when at least one of the first backoff counter and the second backoff counter expires.

In such a manner, the non-legacy terminal according to the embodiment of FIG. 24 adjusts the backoff counter used for the backoff procedure or performs the backoff procedure by using a plurality of backoff counters in the spatial reuse period, to minimize an unfairness that may occur in the legacy terminal.

Figure 25:
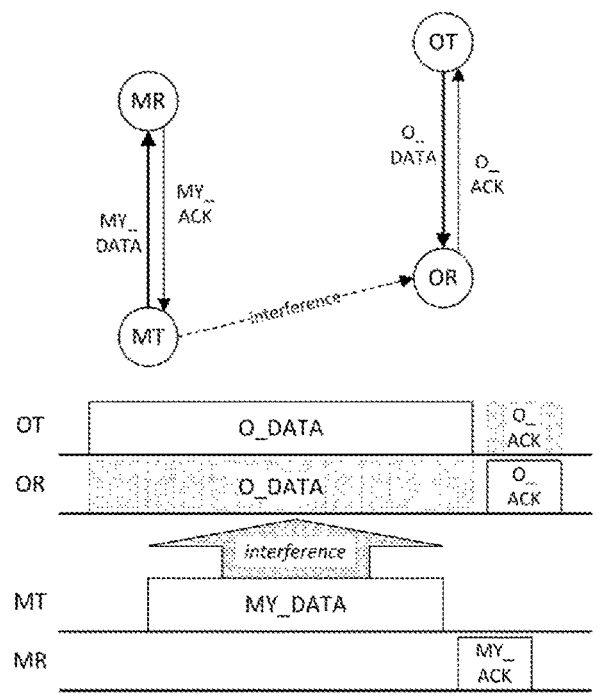
FIG. 25 is a diagram illustrating an interference problem that may occur if an adjusted CCA threshold is used for channel access according to an embodiment of the present invention.

FIG. 25 is a diagram illustrating an interference problem that may occur if an adjusted CCA threshold is used for channel access according to an embodiment of the present invention. According to the embodiment of FIG. 25 and the following embodiments, a MYBSS Transmitter (MT) and a MYBSS Receiver (MR) represents a transmission terminal and a reception terminal of a first BSS, respectively, and an OBSS Transmitter (OT) and an OBSS Receiver (OR) represent a transmission terminal and a reception terminal of a second BSS different from the first BSS.

As shown in FIG. 25, in the OBSS, the terminal OT may transmit data O_DATA to the terminal OT and the terminal OR may transmit a response message O_ACK to the terminal OT in response to the received data O_DATA. On the other hand, the terminal MT of the MYBSS different from the OBSS determines whether the channel is busy based on the received signal strength of the wireless signal O_DATA and the BSS identifier information of the corresponding signal, as in the above embodiment. That is, if the BSS identifier information of the received wireless signal O_DATA is different from the BSS identifier information of the corresponding terminal, the terminal MT performs CCA based on the second CCA threshold CCA-SD 2. In this case, the second CCA threshold CCA-SD 2 has a higher level than the first CCA threshold CCA-SD 1 used in the legacy terminal.

If the received signal strength of O_DATA is lower than the second CCA threshold CCA-SD 2, the terminal MT determines that the channel is in an idle state and performs channel access. That is, the terminal MT performs a backoff procedure and transmits data MY_DATA when the backoff counter of the backoff procedure expires. In addition, the terminal MR receiving MY_DATA from the terminal MT transmits a response message MY_ACK in response thereto.

However, since the channel access of the terminal MT is determined based on the received signal strength of O_DATA transmitted by the terminal OT, MY_DATA transmitted by the terminal MT may cause interference to the terminal OR of the OBSS. Such a problem may occur not only in a single MAC Protocol Data Unit (MPDU) transmission but also in transmission situations based on transmission opportunity (TXOP) or aggregate MPDU (A-MPDU).

Figure 26:
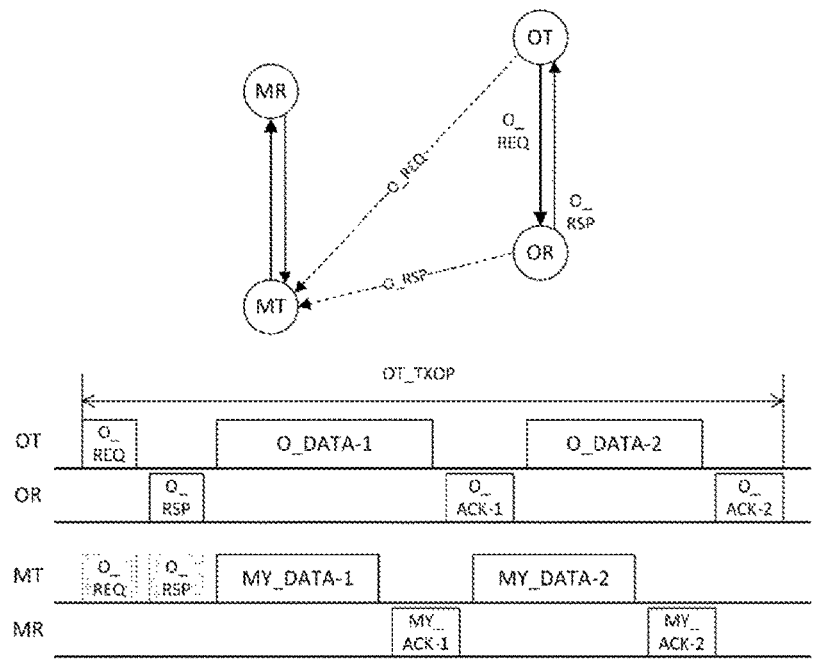
FIGS. 26 to 27 are diagrams illustrating the data transmission method of a non-legacy terminal for minimizing an interference problem between terminals.
Figure 27:
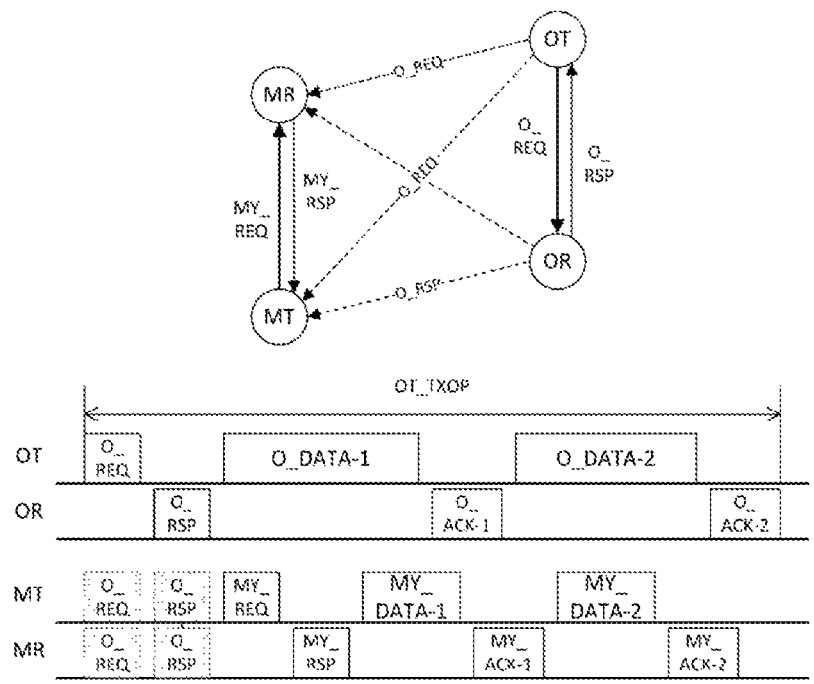

FIGS. 26 to 27 are diagrams illustrating the data transmission method of a non-legacy terminal for minimizing an interference problem between terminals. In the embodiments of FIGS. 26 and 27, the terminal OT of the OBSS may transmit one or a plurality of data O_DATA-1 and O_DATA-2 to the terminal OR and the data is referred to as O_DATA. Additionally, the terminal MT of the MYBSS may transmit one or a plurality of data MY_DATA-1 and MY_DATA-2 to the terminal MR, and the data is referred to as MY_DATA.

First, FIG. 26 is a diagram illustrating an embodiment for minimizing the interference that the terminal MT affects the terminal OR in the OBSS. Referring to FIG. 26, terminals performing wireless LAN communication may exchange a request (REQ) message and a response (RSP) message before data transmission. In an embodiment of the present invention, the request message/response message may represent request-to-send (RTS)/clear-to-send (CTS), a null data packet (NDP)/ACK, or a single MAC Protocol Data Unit (MPDU)/ACK, respectively. In the embodiment of FIG. 26, it is assumed that a request message O_REQ transmitted by the terminal OT of the OBSS and a response message O_RSP transmitted by the terminal OR may be received by the terminal MT of the MYBSS.

According to an embodiment of the present invention, when the terminal MT of the MYBSS receives the request message O_REQ having different BSS identifier information from that of the corresponding terminal and a response message O_RSP corresponding thereto, the terminal MT may determine whether to access a channel, that is, whether to transmit data MY_DATA of the corresponding terminal based on the received signal strengths of O_REQ and O_RSP. In this case, the terminal MT determines whether to transmit MY_DATA based on the result of comparing the received signal strengths of O_REQ and O_RSP with the first CCA threshold CCA-SD 1 and the second CCA threshold CCA-SD 2. Herein, the second CCA threshold CCA-SD 2 has a higher level than the first CCA threshold CCA-SD 1.

First, if the received signal strength of at least one of O_REQ and O_RSP is higher than the second CCA threshold CCA-SD 2, the terminal MT defers the transmission of MY_DATA. Additionally, even when the received signal strengths of O_REQ and O_RSP are both between the first CCA threshold CCA-SD 1 and the second CCA threshold CCA-SD 2, the terminal MT defers the transmission of MY_DATA. However, in this case, the terminal MT may exceptionally perform data transmission according to other additional information such as the importance of data to be transmitted. On the other hand, if the received signal strengths of O_REQ and O_RSP are both lower than the first CCA threshold CCA-SD 1, the terminal MT may access the channel and perform the transmission of MY_DATA.

Next, if the received signal strength of O_REQ is between the first CCA threshold CCA-SD 1 and the second CCA threshold CCA-SD 2, and the received signal strength of O_RSP is lower than the first CCA threshold CCA-SD 1, the terminal MT may access the channel and perform the transmission of MY_DATA. Therefore, if the received signal strength of O_RSP is lower than the first CCA threshold CCA-SD 1 in a situation where the received signal strength of O_REQ is lower than the second CCA threshold CCA-SD 2, the terminal MT may access the channel and perform the transmission of MY_DATA. In this case, it is assumed that the influence of the interference to the terminal OR by the MY_DATA transmitted by the terminal MT is small. Therefore, the terminal OR may successfully receive the data O_DATA-1 and O_DATA-2 transmitted by the terminal OT. In such a way, a period in which channel access is performed based on an adjusted CCA threshold when the BSS identifier information of a received wireless signal is different from the BSS identifier information of a terminal is referred to as a spatial reuse period.

According to an embodiment of the present invention, the terminal MT transmitting data in the spatial reuse period may transmit data immediately without exchanging a separate request message and response message. In addition, the terminal MT may continuously measure the received signal strength of data transmitted by the OBSS terminals in the spatial reuse period, and adjust whether to access the channel in real time based on the measured result. In this case, the same criterion as O_REQ is applied to the data O_DATA-1 and O_DATA-2 transmitted by the terminal OT of the OBSS, and the same criterion as O_RSP may be applied to the data O_ACK-1 and O_ACK-2 transmitted by the terminal OR. If the received signal strength of the data transmitted by the OBSS terminals belongs to a signal strength section equal to the received signal strength of O_REQ or O_RSP corresponding thereto, the terminal MT maintains the operation based on the predetermined channel accessibility. However, if the received signal strength of the data transmitted by the OBSS terminals belongs to a signal strength section different from the received signal strength of O_REQ or O_RSP corresponding thereto, the terminal MT redetermines whether to access the channel based on the received signal strength of the received data. Here, the received signal strength section includes a first section lower than the first CCA threshold CCA-SD 1, a second section between the first CCA threshold CCA-SD 1 and the second CCA threshold CCA-SD 2, and a third section greater than the second CCA threshold CCA-SD 2.

If O_REQ and O_RSP include the length information according to the above-described embodiment, the terminal MT receiving O_REQ and O_RSP may extract the length information from the corresponding message and adjust the data transmission period of the corresponding terminal MT based on the extracted length information. In this case, the terminal MT may omit the operation of extracting the length information from the data O_DATA-1 and O_DATA-2 transmitted by the terminal OT.

Next, FIG. 27 is a diagram illustrating a further embodiment for minimizing the interference to the terminal MR of the MYBSS. In the embodiment of FIG. 27, duplicative description of parts, which are the same as or correspond to the embodiment of FIG. 26, will be omitted.

As described above in the embodiment of FIG. 26, when the terminals of the OBSS transmit O_REQ and O_RSP, the terminals MT and MR of the MYBSS may receive the O_REQ and O_RSP. The terminal MT of the MYBSS determines whether to access the channel based on the received signal strength of O_REQ and O_RSP. According to the embodiment of FIG. 27, when it is determined that the terminal MT accesses the channel, the terminal MT transmits a request message MY_REQ to the terminal MR. MY_REQ is a message indicating that the data transmission of the terminal MT is possible and may be implemented by request-to-send (RTS), null data packet (NDP), or single MAC Protocol Data Unit (MPDU).

The terminal MR receiving MY_REQ from the terminal MT determines whether to receive the data MY_DATA of the terminal MT based on the received signal strengths of O_REQ and O_RSP. In this case, the terminal MR determines whether MY_DATA can be received based on the result of comparing the received signal strengths of O_REQ and O_RSP with the first CCA threshold CCA-SD 1 and the second CCA threshold CCA-SD 2. Herein, the second CCA threshold CCA-SD 2 has a higher level than the first CCA threshold CCA-SD 1.

First, if the received signal strength of at least one of O_REQ and O_RSP is higher than the second CCA threshold CCA-SD 2, the terminal MR may not receive MY_DATA. Additionally, even when the received signal strengths of O_REQ and O_RSP are both between the first CCA threshold CCA-SD 1 and the second CCA threshold CCA-SD 2, the terminal MR may not receive MY_DATA. However, in this case, the terminal MR may exceptionally receive data according to other additional information such as the importance of MY_DATA. On the other hand, if the received signal strengths of O_REQ and O_RSP are both lower than the first CCA threshold CCA-SD 1, the terminal MR may receive MY_DATA.

Next, if the received signal strength of O_RSP is between the first CCA threshold CCA-SD 1 and the second CCA threshold CCA-SD 2, and the received signal strength of O_REQ is lower than the first CCA threshold CCA-SD 1, the terminal MR may receive MY_DATA. Therefore, if the received signal strength of O_REQ is lower than the first CCA threshold CCA-SD 1 in a situation where the received signal strength of O_RSP is lower than the second CCA threshold CCA-SD 2, the terminal MR may receive MY_DATA. In this case, it is assumed that the influence of the interference to the terminal MR by O_DATA transmitted by the terminal OT is small. Therefore, the terminal MR may successfully receive the data MY_DATA-1 and MY_DATA-2 transmitted by the terminal MT.

The terminal MR transmits a response message MY_RSP corresponding to MY_REQ transmitted by the terminal MT, based on whether or not MY_DATA can be received. MY_RSP is a message indicating that data of the terminal MT can be received, and may be implemented by clear-to-send (CTS) or ACK. If the terminal MR is able to receive MY_DATA, the terminal MR transmits MY_RSP corresponding to MY_REQ to the terminal MT. When MY_RSP is received from the terminal MR, the terminal MT may start the transmission of MY_DATA. However, if the terminal MR is not able to receive MY_DATA, the terminal MR does not transmit MY_RSP. When MY_RSP is not received from the terminal MR, the terminal MT may not transmit MY_DATA. In such a way, according to the embodiment of FIG. 27, the terminals of the MYBSS exchange MY_REQ and MY_RSP in the spatial reuse period, so that it is possible to additionally determine whether or not the terminal MR is able to receive the data MY_DATA of the terminal MT without interference.

Figure 28:
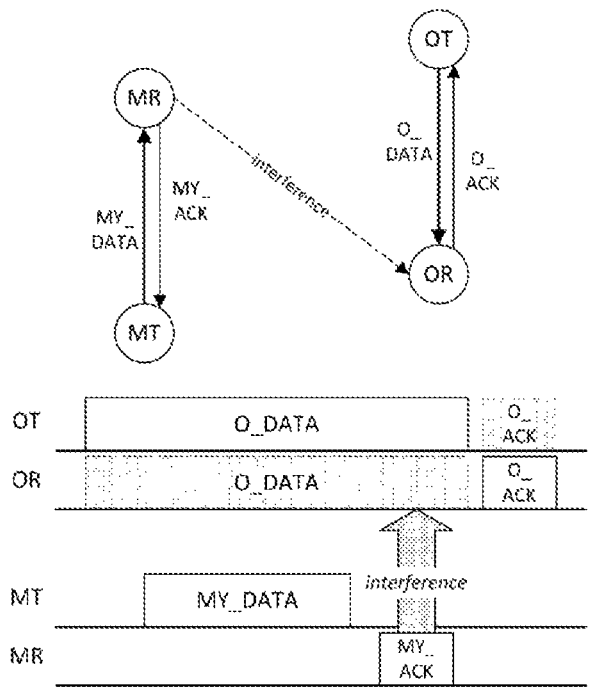
FIGS. 28 and 29 are diagrams illustrating another interference problem that may occur if an adjusted CCA threshold is used for channel access according to an embodiment of the present invention.
Figure 29:
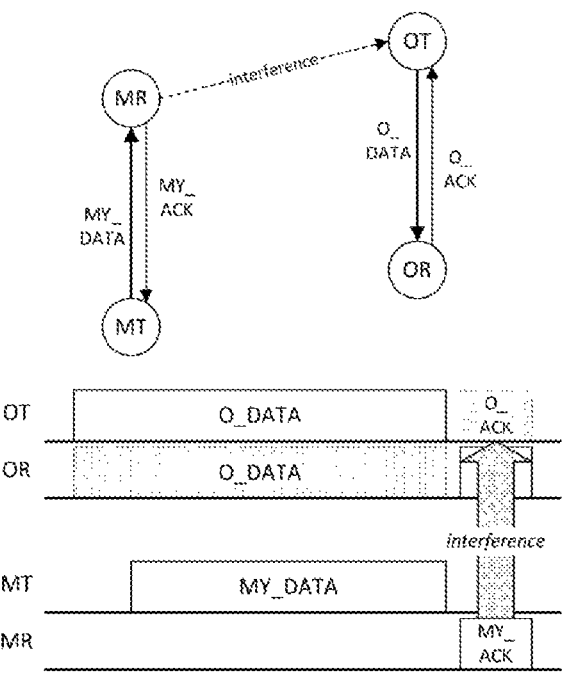

FIGS. 28 and 29 are diagrams illustrating another interference problem that may occur if an adjusted CCA threshold is used for channel access according to an embodiment of the present invention. In the embodiments of FIGS. 28 and 29, duplicative description of parts, which are the same as or correspond to the embodiment of FIG. 25, will be omitted.

As shown in FIGS. 28 and 29, in the OBSS, the terminal OT may transmit data O_DATA to the terminal OR and the terminal OR may transmit a response message O_ACK to the terminal OT in response to the received data O_DATA. On the other hand, the terminal MT of the MYBSS, which is a BSS different from the OBSS, determines whether or not the channel is busy according to the above-described embodiment, and performs channel access. That is, the terminal MT performs a backoff procedure and transmits data MY_DATA when the backoff counter of the backoff procedure expires. In addition, the terminal MR receiving MY_DATA from the terminal MT transmits a response message MY_ACK in response thereto.

However, MY_ACK transmitted by the terminal MR may cause interference to the terminals of the OBSS. Referring to FIG. 28, MY_ACK transmitted by the terminal MR may cause interference when the terminal OR receives the data O_DATA of the terminal OT. In addition, referring to FIG. 29, MY_ACK transmitted by the terminal MR may cause interference when the terminal OT receives the response message O_ACK of the terminal OR.

Figure 30:
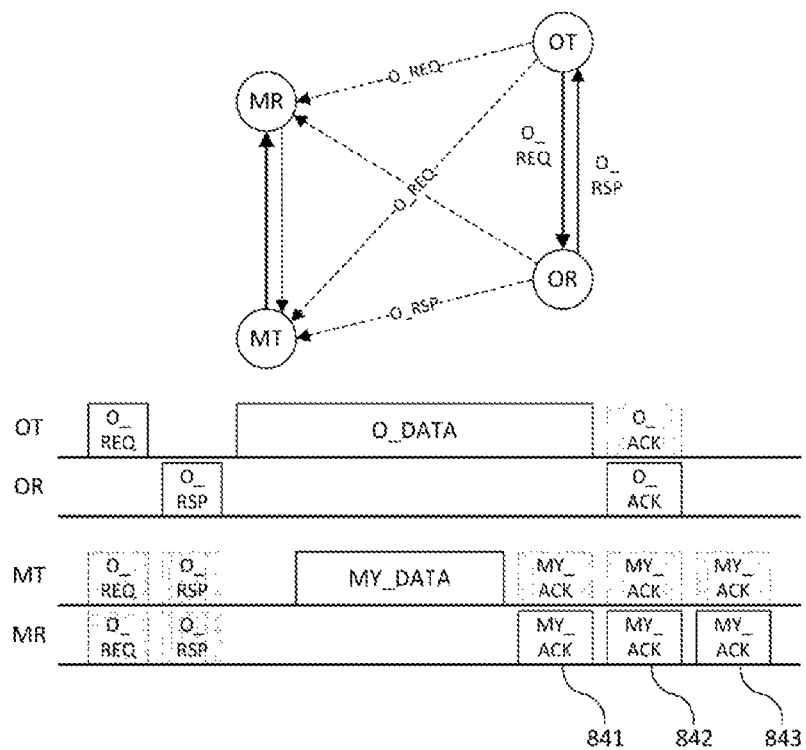
FIG. 30 is a diagram illustrating the data transmission method of a non-legacy terminal for minimizing an interference problem between terminals according to another embodiment of the present invention.

FIG. 30 is a diagram illustrating the data transmission method of a non-legacy terminal for minimizing an interference problem between terminals according to another embodiment of the present invention. In the embodiment of FIG. 30, duplicative description of parts, which are the same as or correspond to the embodiments of FIGS. 26 and 27, will be omitted.

As shown in the drawing, when the terminals of the OBSS transmit O_REQ and O_RSP, the terminals MT and MR of the MYBSS may receive O_REQ and O_RSP. As in the above-described embodiment, the terminal MT of the MYBSS determines whether to access the channel based on the received signal strengths of O_REQ and O_RSP, and transmits the data MY_DATA. In addition, the terminal MR receiving MY_DATA transmits a response message MY_ACK in response thereto. According to an embodiment of the present invention, the terminal MR may determine the transmission time point of MY_ACK based on the received signal strengths of O_REQ and O_RSP. In this case, the terminal MR determines the transmission time point of MY_ACK based on the result of comparing the received signal strengths of O_REQ and O_RSP with the first CCA threshold CCA-SD 1 and the second CCA threshold CCA-SD 2. Herein, the second CCA threshold CCA-SD 2 has a higher level than the first CCA threshold CCA-SD 1.

First, if the received signal strength of O_REQ is between the first CCA threshold CCA-SD 1 and the second CCA threshold CCA-SD 2, and the received signal strength of O_RSP is lower than the first CCA threshold CCA-SD 1, the terminal MR transmits MY_ACK 841 within the transmission period of the data O_DATA of the terminal OT. In this case, it is assumed that the influence of the interference to the terminal OR of the OBSS by MY_ACK 841 transmitted by the terminal MR is small. Therefore, the terminal OR may successfully receive O_DATA transmitted by the terminal OT.

Next, if the received signal strength of O_RSP is between the first CCA threshold CCA-SD 1 and the second CCA threshold CCA-SD 2, and the received signal strength of O_REQ is lower than the first CCA threshold CCA-SD 1, the terminal MR transmits MY_ACK 842 simultaneously when the terminal OR transmits the response message O_ACK. In this case, it is assumed that the influence of the interference to the terminal OT of the OBSS by MY_ACK 842 transmitted by the terminal MR is small. Accordingly, the terminal OT may successfully receive O_ACK transmitted by the terminal OR.

Next, if the received signal strengths of O_REQ and O_RSP are both higher than the second CCA threshold CCA-SD 2, the terminal MR transmits MY_ACK 843 after the transmissions of the data O_DATA of the terminal OT and the response message O_ACK of the terminal OR are completed. In this case, it is assumed that MY_ACK 843 transmitted by the terminal MR interferes with the terminals OT and OR of the OBSS. Therefore, since the terminal MR transmits MY_ACK 843 after the data exchange of the terminals OT and OR is completed, so that data collision that may occur to the OBSS terminals may be prevented.

According to a further embodiment of the present invention, the terminal MR may adjust the transmission power of MY_ACK in consideration of the transmission power of the corresponding terminal and the received signal strength of MY_DATA. Through this, the terminal MR may minimize the amount of interference that MY_ACK gives to the terminal OT or the terminal OR.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal comprising:
a transceiver; and
a processor,
wherein the terminal receives a wireless signal through the transceiver,
wherein the processor is configured to:
extract length information from the wireless signal, wherein the length information represents duration of the wireless signal,
extract basic service set (BSS) identifier information of the wireless signal,
determine whether the wireless signal is a wireless signal of an overlapping BSS based on the extracted BSS identifier information, and
set a transmission opportunity (TXOP) of the terminal based on the extracted length information when the wireless signal is determined to be a wireless signal of an overlapping BSS.

2. The wireless communication terminal of claim 1, wherein the TXOP of the terminal is limited to the duration of the wireless signal when the wireless signal is determined to be a wireless signal of an overlapping BSS.

3. The wireless communication terminal of claim 2, wherein the processor is further configured to:
measure a signal strength of the wireless signal,
determine a channel in which the wireless signal is received is busy when the measured signal strength is at or above a first threshold,
reset the determination that the channel is busy when the wireless signal is determined to be a wireless signal of an overlapping BSS and the measured signal strength is below a second threshold,
wherein the TXOP of the terminal is limited when the determination is reset.

4. The wireless communication terminal of claim 3, wherein the second threshold has a value equal to or higher than the first threshold.

5. The wireless communication terminal of claim 2, wherein the TXOP of the terminal is set to be terminated simultaneously or before the duration of the wireless signal.

6. The wireless communication terminal of claim 1, wherein information of the TXOP of the terminal is included in a non-legacy preamble of a wireless signal transmitted by the terminal.

7. A wireless communication method of a terminal, the method comprising:

receiving a wireless signal;

extracting length information from the wireless signal, wherein the length information represents duration of the wireless signal;

extracting basic service set (BSS) identifier information of the wireless signal;

determining whether the wireless signal is a wireless signal of an overlapping BSS based on the extracted BSS identifier information; and setting a transmission opportunity (TXOP) of the terminal based on the extracted length information when the wireless signal is determined to be a wireless signal of an overlapping BSS.

8. The wireless communication method of claim 7, wherein the TXOP of the terminal is limited to the duration of the wireless signal when the wireless signal is determined to be a wireless signal of an overlapping BSS.

9. The wireless communication method of claim 8, further comprising:

measuring a signal strength of the wireless signal;

determining a channel in which the wireless signal is received is busy when the measured signal strength is at or above a first threshold; and resetting the determination that the channel is busy when the wireless signal is determined to be a wireless signal of an overlapping BSS and the measured signal strength is below a second threshold;

wherein the TXOP of the terminal is limited when the determination is reset.

10. The wireless communication method of claim 9, wherein the second threshold has a value equal to or higher than the first threshold.

11. The wireless communication method of claim 8, wherein the TXOP of the terminal is set to be terminated simultaneously or before the duration of the wireless signal.

12. The wireless communication method of claim 7, wherein information of the TXOP of the terminal is included in a non-legacy preamble of a wireless signal transmitted by the terminal.

* * * * *